(12) United States Patent
Shi

(10) Patent No.: US 11,876,355 B2
(45) Date of Patent: Jan. 16, 2024

(54) ELECTRIC SWITCHING APPARATUS

(71) Applicants: SHANGHAI LEADING CONNECTION MECHATRONICS TECHNOLOGY CO., LTD., Shanghai (CN); JIANGSU LUOKAI MECHANICAL AND ELECTRICAL CO., LTD., Changzhou (CN)

(72) Inventor: Zheng Shi, Shanghai (CN)

(73) Assignees: SHANGHAI LEADING CONNECTION MECHATRONICS TECHNOLOGY CO., LTD., Shanghai (CN); JIANGSU LUOKAI MECHANICAL AND ELECTRICAL CO., LTD., Changzhou (CN)

( * ) Notice: Subject to any disclaimer, the term of this patent is extended or adjusted under 35 U.S.C. 154(b) by 28 days.

(21) Appl. No.: 17/651,219

(22) Filed: Feb. 15, 2022

(65) Prior Publication Data

US 2022/0173580 A1 Jun. 2, 2022

Related U.S. Application Data

(63) Continuation of application No. PCT/CN2020/109086, filed on Aug. 14, 2020.

(51) Int. Cl.
*H02B 11/173* (2006.01)
*H02B 11/02* (2006.01)

(52) U.S. Cl.
CPC .......... *H02B 11/173* (2013.01); *H02B 11/02* (2013.01)

(58) Field of Classification Search
CPC ..... H02B 11/02; H02B 11/127; H02B 11/133; H02B 11/173
See application file for complete search history.

(56) References Cited

U.S. PATENT DOCUMENTS

| 1,828,522 | A | * | 10/1931 | David | H02B 11/04 361/615 |
| 4,032,207 | A | * | 6/1977 | Ericson | H02B 11/133 439/577 |
| 4,033,660 | A | | 7/1977 | Ericson et al. | |
| 4,051,334 | A | * | 9/1977 | Ericson | H02B 11/133 200/50.25 |

(Continued)

FOREIGN PATENT DOCUMENTS

| CN | 1734868 A | 2/2006 |
| CN | 202332754 U | 7/2012 |

(Continued)

OTHER PUBLICATIONS

International Search Report issued in Application No. PCT/CN2020/109086, dated Nov. 19, 2020 (5 pages).

(Continued)

*Primary Examiner* — Robert J Hoffberg
(74) *Attorney, Agent, or Firm* — Osha Bergman Watanabe & Burton LLP

(57) ABSTRACT

Disclosed in the present invention is an electric switching apparatus, comprising a drawer apparatus, an electric connection apparatus, a driving mechanism, and a locking mechanism. A busbar of the breaker body at the separate position is separated from the electric connection apparatus, and the breaker body cannot be switched on. The busbar of the breaker body at the trial position is separated from the electric connection apparatus, and the breaker body can be switched on. The busbar of the breaker body at the connected but not clamped position is in touch with the electric connection apparatus, the electric connection apparatus does not clamp the busbar, and the breaker body cannot be switched on. The busbar of the breaker body at the connected and clamped position is in touch with the electric connection apparatus, the electric connection apparatus clamps the busbar, and the breaker body can be switched on.

15 Claims, 16 Drawing Sheets

(56) References Cited

U.S. PATENT DOCUMENTS

| | | | | |
|---|---|---|---|---|
| 4,051,335 A | * | 9/1977 | Ericson | H02B 11/133 |
| | | | | 361/609 |
| 4,063,305 A | * | 12/1977 | Ericson | H02B 11/133 |
| | | | | 200/50.25 |
| 6,160,229 A | * | 12/2000 | Grelier | H02B 11/10 |
| | | | | 200/50.26 |
| 6,291,783 B1 | * | 9/2001 | Nebon | H02B 11/10 |
| | | | | 200/50.26 |
| 8,304,672 B2 | * | 11/2012 | Lee | H02B 11/127 |
| | | | | 200/50.25 |
| 9,843,170 B2 | | 12/2017 | Waynick, Sr. et al. | |
| 2011/0147173 A1 | | 6/2011 | Lee et al. | |
| 2022/0115188 A1 | * | 4/2022 | Shi | H02B 11/12 |

FOREIGN PATENT DOCUMENTS

| | | | | |
|---|---|---|---|---|
| CN | 203445559 U | | 2/2014 | |
| CN | 105703252 A | * | 6/2016 | ........... H02B 11/133 |
| CN | 109066440 A | * | 12/2018 | ........... H02B 11/133 |
| CN | 111403938 A | | 7/2020 | |
| CN | 111403939 A | | 7/2020 | |
| CN | 211017487 U | | 7/2020 | |
| CN | 211045800 U | | 7/2020 | |
| CN | 114079248 A | * | 2/2022 | ........... H02B 11/133 |
| CN | 114256770 A | * | 3/2022 | |
| CN | 114256771 A | * | 3/2022 | ............ H02B 11/10 |
| GB | 273472 A | | 7/1927 | |
| KR | 20100101989 A | | 9/2010 | |

OTHER PUBLICATIONS

Written Opinion issued in Application No. PCT/CN2020/109086, dated Nov. 19, 2020 (6 pages).

Extended European Search Report issued in European Application No. 20852749.9, dated Jul. 25, 2023 (10 pages).

* cited by examiner

ELECTRIC SWITCHING APPARATUS

FIELD OF THE INVENTION

Embodiments of the present invention relate to the field of electrical appliance, and more specifically, to electric switching apparatus with a draw-out structure.

THE RELATED ART

The electric switching apparatus generally has a draw-out structure, and the common electric switching apparatus includes: universal circuit breakers, molded case circuit breakers, automatic transfer switches with drawer apparatus, medium voltage circuit breakers, switch cabinets, etc. An apparatus with a draw-out structure includes a body and a drawer apparatus. The body uses a bridge-type contact as the body busbar, and the drawer apparatus is provided with a contact bridge for electrical connection with the body busbar. The contact bridge on the drawer apparatus is connected with external inlet and outlet terminals. When the body is pushed into the drawer apparatus, the body busbar contacts the contact bridge to form a conductive path, and the body is connected with the external inlet and outlet terminals. When the body is pulled out of the drawer apparatus, the body busbar is separated from the contact bridge, cutting off the conductive path, and achieving isolation, which is convenient for trialing or maintenance. The body busbar and the contact bridge constitute an electric connection apparatus for an electric apparatus with a draw-out structure. In some products, the bridge-type contact may be mounted on the drawer apparatus while the contact bridge may be mounted on the body. In such a configuration, the electric connection apparatus of the electric apparatus with a draw-out structure is still formed by the busbar and the contact bridge, of which the basic principle is the same as the aforementioned structure.

In the patent applications with publication number CN111403939A and CN111403938A and the patents with publication number CN211017487U and CN211045800U that the applicant of the present application has filed, they introduce the defect of an electric connection apparatus used in the prior art, and provide an electric connection apparatus of a new structure. The electric connection apparatus of the new structure separates the insertion-exit process and the clamping process, reducing the operation difficulty; meanwhile, contact area of the clamping force and the electric connection is ensured, and electrical performance of the electrical connection is effectively improved.

Due to the structure of the new electric connection apparatus is greatly different from that of a traditional electric connection apparatus, the electric switching apparatus using the new electric connection apparatus needs to be matched with a corresponding driving operation mechanism.

SUMMARY

According to an embodiment of the present invention, an electric switching apparatus is provided. The electric switching apparatus comprises: a drawer apparatus, and a breaker body enters or exits the drawer apparatus; an electric connection apparatus, being installed on the drawer apparatus, the electric connection apparatus includes a clamping mechanism, and the electric connection apparatus connects a busbar of the breaker body and an external circuit; a driving mechanism, driving the breaker body to move, so that the busbar of the breaker body enters or leaves an area of the electric connection apparatus; a locking mechanism, driving the clamping mechanism of the electric connection apparatus, so that the electric connection apparatus clamps or loosens the busbar of the breaker body; wherein the driving mechanism drives the breaker body to move, a relative position of the breaker body and the drawer apparatus includes: a separation position, in which the breaker body is separated from the electric connection apparatus, and the breaker body cannot be switched on; a trial position, in which the breaker body is separated from the electric connection apparatus, and the breaker body can be switched on; a connected but not clamped position, in which the breaker body is in touch with the electric connection apparatus, the electric connection apparatus does not clamp the busbar, and the breaker body cannot be switched on; a connected and clamped position, in which the breaker body is in touch with the electric connection apparatus, the electric connection apparatus clamps the busbar, and the breaker body can be switched on.

According to an embodiment of the present invention, the driving mechanism is installed on the drawer apparatus, and the driving mechanism comprises: a driving shaft, one end of the driving shaft is connected to a handle, and the handle is rotated to drive the driving shaft to rotate; a sliding plate, installed on the driving shaft, rotation of the driving shaft is converted into sliding of the sliding plate, the driving shaft drives the sliding plate to move, and the sliding plate moves towards inner side or outer side of the drawer apparatus to drive the breaker body to enter or exit the drawer apparatus; a main shaft, installed on the drawer apparatus, the main shaft matches with the sliding plate, when the sliding plate moves to the separation position, the trial position, the connected but not clamped position and the connected and clamped position, the main shaft correspondingly rotates to a separation angle, a trial angle, a connected but not clamped angle and a connected and clamped angle; a supporting plate, installed on the drawer apparatus, the supporting plate drives the breaker body to move and matches with the main shaft, when the main shaft rotates to the separation angle, the trial angle, the connected but not clamped angle and the connected and clamped angle, the supporting plate drives the breaker body to the separation position, the trial position, the connected but not clamped position and the connected and clamped position.

According to an embodiment of the present invention, the sliding plate includes a first driving groove, a second driving groove, an unlocking groove and an interlocking groove; a first cantilever and a second cantilever are installed on the main shaft, the first cantilever includes a bifurcated first driving rod and an interlocking rod; and the second cantilever includes a bifurcated second driving rod and an unlocking rod; the first driving groove and the interlocking groove form drive coupling with the first driving rod and the interlocking rod on the first cantilever, and the second driving groove and unlocking groove form drive coupling with the second driving rod and unlocking rod on the second cantilever.

According to an embodiment of the present invention, the breaker body enters the drawer apparatus, and sequentially passes through the separation position, the trial position, the connected but not clamped position and the connected and clamped position;

in the separation position, the main shaft is located at the separation angle, the first driving rod is located in the first driving groove, the second driving rod is located in the second driving groove, the unlocking rod does not act with the unlocking groove, and the interlocking rod does not act with the interlocking groove;

moving from the separation position to the trial position, the sliding plate moves towards inner side of the drawer apparatus, outer side end of the first driving groove pushes the first driving rod, outer side end of the second driving groove pushes the second driving rod, so that the main shaft rotates to the trial angle, the unlocking rod does not act with the unlocking groove, and the interlocking rod does not act with the interlocking groove;

moving from the trial position to the connected but not clamped position, the sliding plate moves towards inner side of the drawer apparatus, outer side end of the first driving groove pushes the first driving rod until the first driving rod disengages from the first driving groove, outer side end of the second driving groove pushes the second driving rod until the second driving rod disengages from the second driving groove, so that the main shaft rotates to the connected but not clamped angle, the unlocking rod enters the unlocking groove, but the unlocking rod does not act with the unlocking groove, and the interlocking rod does not act with the interlocking groove;

moving from the connected but not clamped position to the connected and clamped position, the sliding plate moves towards inner side of the drawer apparatus, outer side end of the unlocking groove pushes the unlocking rod to enable the main shaft to rotate to the connected and clamped angle, and the interlocking rod enters the interlocking groove, but the interlocking rod does not act with the interlocking groove.

According to an embodiment of the present invention, the breaker body exits the drawer apparatus, and sequentially passes through the connected and clamped position, the connected but not clamped position, the trial position and the separation position;

in the connected and clamped position, the main shaft is located at the connected and clamped angle, the interlocking rod is located in the interlocking groove, the unlocking rod is located in the unlocking groove, the first driving rod does not act with the first driving groove, and the second driving rod does not act with the second driving groove;

moving from the connected and clamped position to the connected but not clamped position, the sliding plate moves towards outer side of the drawer apparatus, inner side end of the interlocking groove pushes the interlocking rod until the interlocking rod disengages from the interlocking groove, so that the main shaft rotates to the connected but not clamped angle, the unlocking rod is located in the unlocking groove, but the unlocking rod does not act with the unlocking groove, the first driving rod does not act with the first driving groove, and the second driving does not act with the second driving groove;

moving from the connected but not clamped position to the trial position, the sliding plate moves towards outer side of the drawer apparatus, inner side end of the unlocking groove pushes the unlocking rod, so that the main shaft rotates from the connected but not clamped angle to the trial angle, the first driving rod enters the first driving groove, the second driving rod enters the second driving groove, the inner side end of the unlocking groove pushes the unlocking rod until the unlocking rod disengages from the unlocking groove, inner side end of the first driving groove continues to push the first driving rod, and inner side end of the second driving groove continues to push the second driving rod, so that the main shaft rotates to the trial angle;

moving from the trial position to the separation position, the sliding plate moves towards the outer side of the drawer apparatus, the inner side end of the first driving groove pushes the first driving rod, and the inner side end of the second driving groove pushes the second driving rod, so that the main shaft rotates to the separation angle, the first driving rod is kept in the first driving groove, and the second driving rod is kept in the second driving groove.

According to an embodiment of the present invention, a transmission gear is installed at both ends of the main shaft, a bottom of the supporting plate is circular and possesses transmission teeth, the transmission teeth are engaged with the transmission gear, and the main shaft rotates to drive the supporting plate to rotate; inner side wall of the supporting plate extends to top to form an interlocking plate, a driving groove is formed at inner side end of a top position of the supporting plate, a connecting surface is formed at outer side end of a top position of the supporting plate, and a convex angle is formed in a top position of outer side wall of the supporting plate to form an exit driving part.

According to an embodiment of the present invention, the electric switching apparatus further comprises a side sliding plate, the side sliding plate includes an entering shaft pin and an exit shaft pin, the breaker body is installed on the side sliding plate, the entering shaft pin is located on inner side, the exit shaft pin is located on outer side, the breaker body enters the drawer apparatus, and sequentially passes through the separation position, the trial position, the connected but not clamped position and the connected and clamped position;

in the separation position, the main shaft is located at the separation angle, the supporting plate is also located at the separation angle, the entering shaft pin of the side sliding plate is located in the driving groove, the breaker body is located at the separation position;

moving from the separation position to the trial position, the main shaft rotates from the separation angle to the trial angle to drive the supporting plate to also rotate from the separation angle to the trial angle, and outer side end of the driving groove pushes the entering shaft pin of the side sliding plate, the breaker body is driven to move from the separation position to the trial position;

moving from the trial position to the connected but not clamped position, the main shaft rotates from the trial angle to the connected but not clamped angle to drive the supporting plate to also rotate from the trial angle to the connected but not clamped angle, and outer side end of the driving groove pushes the entering shaft pin of the side sliding plate until the entering shaft pin disengages from the driving groove and stays on the connecting surface of the supporting plate, the breaker body is driven to move from the trial position to the connected but not clamped position;

moving from the connected but not clamped position to the connected and clamped position, the main shaft rotates from the connected but not clamped angle to the connected and clamped angle to drive the supporting plate to also rotate from the connected but not clamped angle to the connected and clamped angle, the entering shaft pin slides on the connecting surface of the supporting plate, the supporting plate does not act with the entering shaft pin, and the breaker body does not move.

According to an embodiment of the present invention, the breaker body exits the drawer apparatus, and sequentially passes through the connected and clamped position, the connected but not clamped position, the trial position and the separation position;

in the connected and clamped position, the main shaft is located at the connected and clamped angle, the supporting plate is located at the connected and clamped angle, the entering shaft pin of the side sliding plate is located on the connecting surface of the supporting plate, and the exit shaft pin of the side sliding plate is not in touch with the supporting plate;

moving from the connected and clamped position to the connected but not clamped position, the main shaft rotates from the connected and clamped angle to the connected but not clamped angle to drive the supporting plate to also rotate from the connected and clamped angle to the connected but not clamped angle, the entering shaft pin slides on the connecting surface of the supporting plate, the supporting plate does not act with the entering shaft pin or the exit shaft pin, and the breaker body does not move;

moving from the connected but not clamped position to the trial position, the main shaft rotates from the connected but not clamped angle to the trial angle to drive the supporting plate to also rotate from the connected but not clamped angle to the trial angle, the exit driving part of the supporting plate pushes the exit shaft pin to drive the breaker body to move towards the outer side, the entering shaft pin enters the driving groove from the connecting surface of the supporting plate, the exit shaft pin separates from the supporting plate, and the inner side end of the driving groove pushes the entering shaft pin, so that the breaker body continues to move towards the outer side to the trial position;

moving from the trial position to the separation position, the main shaft rotates from trial angle to the separation angle to drive the supporting plate also rotates from trial angle to the separation angle, the inner side end of the driving groove pushes the entering shaft pin, so that the breaker body to move towards the outer side to the separation position.

According to an embodiment of the present invention, the electric switching apparatus further comprises an interlocking mechanism, the interlocking mechanism matches with a tripping rod of the breaker body to allow or prevent the breaker body from switching on, the interlocking mechanism is installed on the drawer apparatus, and the interlocking mechanism comprises: a drawer interlocking piece, installed on the drawer apparatus, the drawer interlocking piece is close to outer side of the drawer apparatus, outer side end and inner side end of the drawer interlocking piece form protruding interlocking parts, and a concave releasing part is formed in a middle of the drawer interlocking piece; a drawer push rod, installed on the drawer apparatus, the drawer push rod is located on inner side of the drawer interlocking piece, a middle of the drawer push rod is rotatably connected to the drawer apparatus through a rotating shaft, top of the drawer push rod is a horizontal interlocking rod, a bottom of the drawer push rod is an inclined trigger rod, the drawer push rod possesses an interlocking position and a release position, the interlocking rod is pressed downward in the interlocking position and lifted upwards in the release position, the drawer push rod includes a push rod spring, the spring force of the push rod spring enables the drawer push rod to rotate towards the release position; an interlocking plate, formed by inner side wall of the supporting plate extending to top.

According to an embodiment of the present invention, the breaker body includes the tripping rod, when the tripping rod is locked, the breaker body cannot be switched on, when the tripping rod is released, the breaker body can be switched on, the breaker body enters the drawer apparatus, and sequentially passes through the separation position, the trial position, the connected but not clamped position and the connected and clamped position;

in the separation position, the interlocking part at outer side end of the drawer interlocking piece locks the tripping rod, the breaker body cannot be switched on;

moving from the separation position to the trial position, the breaker body moves towards inner side, the tripping rod enters a concave releasing part in a middle of the drawer interlocking piece, the tripping rod is released, and the breaker body can be switched on;

moving from the trial position to the connected but not clamped position, the breaker body moves towards inner side, the tripping rod disengages from the releasing part of the drawer interlocking piece and is locked by the interlocking part at inner side end of the drawer interlocking piece, the breaker body cannot be switched on, the breaker body continues to move inwards, the interlocking plate rotates along with the supporting plate and is in touch with the trigger rod of the drawer push rod, the drawer push rod rotates from the release position to the interlocking position, the tripping rod is separated from the drawer interlocking piece, but the tripping rod continues to be locked by the interlocking rod of the drawer push rod, and the breaker body cannot be switched on;

moving from the connected but not clamped position to the connected and clamped position, the breaker body does not move, the interlocking plate rotates along with the supporting plate and is separated from the trigger rod of the drawer push rod, the drawer push rod rotates from the interlocking position to the release position under the action of the push rod spring, the interlocking rod of the drawer push rod releases the tripping rod, and the breaker body can be switched on.

According to an embodiment of the present invention, the breaker body exits the drawer apparatus, and sequentially passes through the connected and clamped position, the connected but not clamped position, the trial position and the separation position;

in the connected and clamped position, the drawer push rod is located at the release position under the action of the push rod spring, the tripping rod is released, and the breaker body can be switched on;

moving from the connected and clamped position to the connected but not clamped position, the breaker body does not move, the interlocking plate rotates along with the supporting plate and is in touch with the trigger rod of the drawer push rod, the drawer push rod rotates from the release position to the interlocking position under an action of the interlocking plate, the interlocking rod of the drawer push rod locks the tripping rod, and the breaker body cannot be switched on;

moving from the connected but not clamped position to the trial position, the breaker body moves towards outer side, the tripping rod is separated from the interlocking rod of the drawer push rod but continues to be locked by the interlocking part at inner side end of the drawer interlocking piece, the breaker body cannot be switched on, the breaker body moves to the trial position, the tripping rod enters the concave releasing part in a middle of the drawer interlocking piece, the tripping rod is released, and the breaker body can be switched on;

moving from the trial position to the separation position, the breaker body moves towards outer side, the tripping rod disengages from the releasing part of the drawer interlocking piece and is locked by the interlocking part at inner side end of the drawer interlocking piece, and the breaker body cannot be switched on.

According to an embodiment of the present invention, the driving mechanism drives the locking mechanism to enable the locking mechanism to drive the clamping mechanism of the electric connection apparatus, the electric connection apparatus clamps or releases the busbar of the breaker body, the locking mechanism is installed on the drawer apparatus, and the locking mechanism comprises: a locking gear, installed on the drawer apparatus and can rotate; a locking transmission shaft, connecting the locking gear and the locking mechanism of the electric connection apparatus, the locking gear rotates, and the clamping mechanism is driven to clamp or loosen the busbar of the breaker body through the locking transmission shaft; a locking rack, formed on the sliding plate, the locking rack extends towards outer side from inner side end of the sliding plate; the sliding plate moves towards inner side, the locking rack is in touch and engaged with the locking gear to drive the locking gear to rotate according to the clamping direction, the clamping mechanism clamps the busbar of the breaker body; the sliding plate moves towards outer side to drive the locking gear to rotate according to the loosening direction, the clamping mechanism loosen the busbar of the breaker body, the sliding plate continues to move towards outer side, and the locking rack disengages from the locking gear.

According to an embodiment of the present invention, the breaker body enters the drawer apparatus, and sequentially passes through the separation position, the trial position, the connected but not clamped position and the connected and clamped position;

in the separation position and the trial position, the locking gear disengages from the locking rack;

moving from the trial position to the connected but not clamped position, the sliding plate and the breaker body move towards inner side, the busbar of the breaker body gradually enters the electric connection apparatus, the locking rack is in touch and engaged with the locking gear to drive the locking gear to rotate according to the clamping direction, the clamping mechanism is gradually clamped;

moving from the connected but not clamped position to the connected and clamped position, the breaker body does not move, the busbar of the breaker body completely enters the electric connection apparatus, and the sliding plate continues to move towards inner side; the locking rack is engaged with the locking gear to drive the locking gear to continue to rotate in the clamping direction, and the clamping mechanism clamps the busbar of the breaker body.

According to an embodiment of the present invention, the breaker body exits the drawer apparatus, and sequentially passes through the connected and clamped position, the connected but not clamped position, the trial position and the separation position;

moving from the connected and clamped position to the connected but not clamped position, the breaker body does not move, the sliding plate moves towards the outer side, the locking rack is engaged with the locking gear to drive the locking gear to rotate in the loosening direction, and the clamping mechanism loosens the busbar of the breaker body;

moving from the connected but not clamped position to the trial position, the sliding plate and the breaker body move towards the outer side, the busbar of the breaker body gradually exits the electric connection apparatus, the locking rack is engaged with the locking gear to drive the locking gear to continue to rotate in the loosening direction, and the clamping mechanism continues to loosen, the sliding plate and the breaker body move towards outer side to the trial position, the busbar of the breaker body separates from the electric connection apparatus, the locking rack disengages from the locking gear;

moving from the trial position to the separation position, the locking gear disengages from the locking rack.

According to an embodiment of the present invention, the breaker body enters the drawer apparatus, and sequentially passes through the separation position, the trial position, the connected but not clamped position and the connected and clamped position;

in the separation position and the trial position, the locking gear disengages from the locking rack;

moving from the trial position to the connected but not clamped position, the sliding plate and the breaker body move towards inner side, the busbar of the breaker body gradually enters the electric connection apparatus, the locking rack is in touch and engaged with the locking gear to drive the locking gear to rotate according to the clamping direction, the clamping mechanism is gradually clamped;

moving from the connected but not clamped position to the connected and clamped position, the breaker body does not move, the busbar of the breaker body completely enters the electric connection apparatus, and the sliding plate continues to move towards inner side; the locking rack is in touch and engaged with the locking gear to drive the locking gear to continue to rotate in the clamping direction, and the clamping mechanism clamps the busbar of the breaker body.

According to an embodiment of the present invention, the breaker body exits the drawer apparatus, and sequentially passes through the connected and clamped position, the connected but not clamped position, the trial position and the separation position;

moving from the connected and clamped position to the connected but not clamped position, the breaker body does not move, the sliding plate moves towards outer side, the locking rack is engaged with the locking gear to drive the locking gear to rotate in the loosening direction, and the clamping mechanism loosens the busbar of the breaker body, the sliding plate moves to outer side to the connected but not clamped position, the locking rack disengages from the locking gear;

moving from the connected but not clamped position to the trial position, the sliding plate and the breaker body move towards the outer side, the busbar of the breaker body gradually exits the electric connection apparatus, the locking rack disengages from the locking gear;

moving from the trial position to the separation position, the locking gear disengages from the locking rack.

The electric switching apparatus provided by the invention has an electric connection apparatus of new structure, the electric connection apparatus can be configured with a large clamping force to clamp the body busbar according to the requirements, so that the overall contact resistance of the electric apparatus is reduced, especially in the long-term use, the power consumption is reduced, and the use cost is saved. The higher the rated current is, the more significant this advantage is. On the other hand, the reduction in contact resistance reduces the temperature rise of the product and the heat generation of the electric apparatus. It is no longer necessary to consider a large heat dissipation space, which is effective in reducing the size of the product and improving the reliability of long-term use. According to the electric switching apparatus disclosed in the invention provides the drawer apparatus, the driving mechanism, the locking mechanism and the interlocking mechanism which are matched with the electric connection apparatus, combined with the characteristics of the electric connection apparatus, the electric switching apparatus in this invention has four working positions: the separation position, the trial position, the connected but not clamped position and the connected and clamped position, so that the operability and the safety of the electric switching apparatus are ensured. On the other hand, the busbar of the breaker body enters the electric connection apparatus, and the electric contact clamping between the busbar of the breaker body enters the electric connection apparatus is divided into two processes: connected but not clamped process and connected and clamped process, the operation force of the movement of the breaker body and the clamping force of the electric connection apparatus are not affected, the operation force of the whole process of the circuit breaker body entering the drawer apparatus is greatly reduced, and mutual compromise is not needed between the two kinds of forces.

BRIEF DESCRIPTION OF THE DRAWINGS

The above and other features, properties and advantages of the present invention will become more apparent through the following description in conjunction with the accompanying drawings and embodiments. In the accompanying drawings, the same reference numerals always indicate the same features, wherein:

FIG. 1a illustrates the state that the circuit breaker body has not entered the drawer apparatus, FIG. 1b illustrates the state that the circuit breaker body has entered the drawer apparatus.

DETAILED DESCRIPTION OF EMBODIMENTS

Figure 1A:
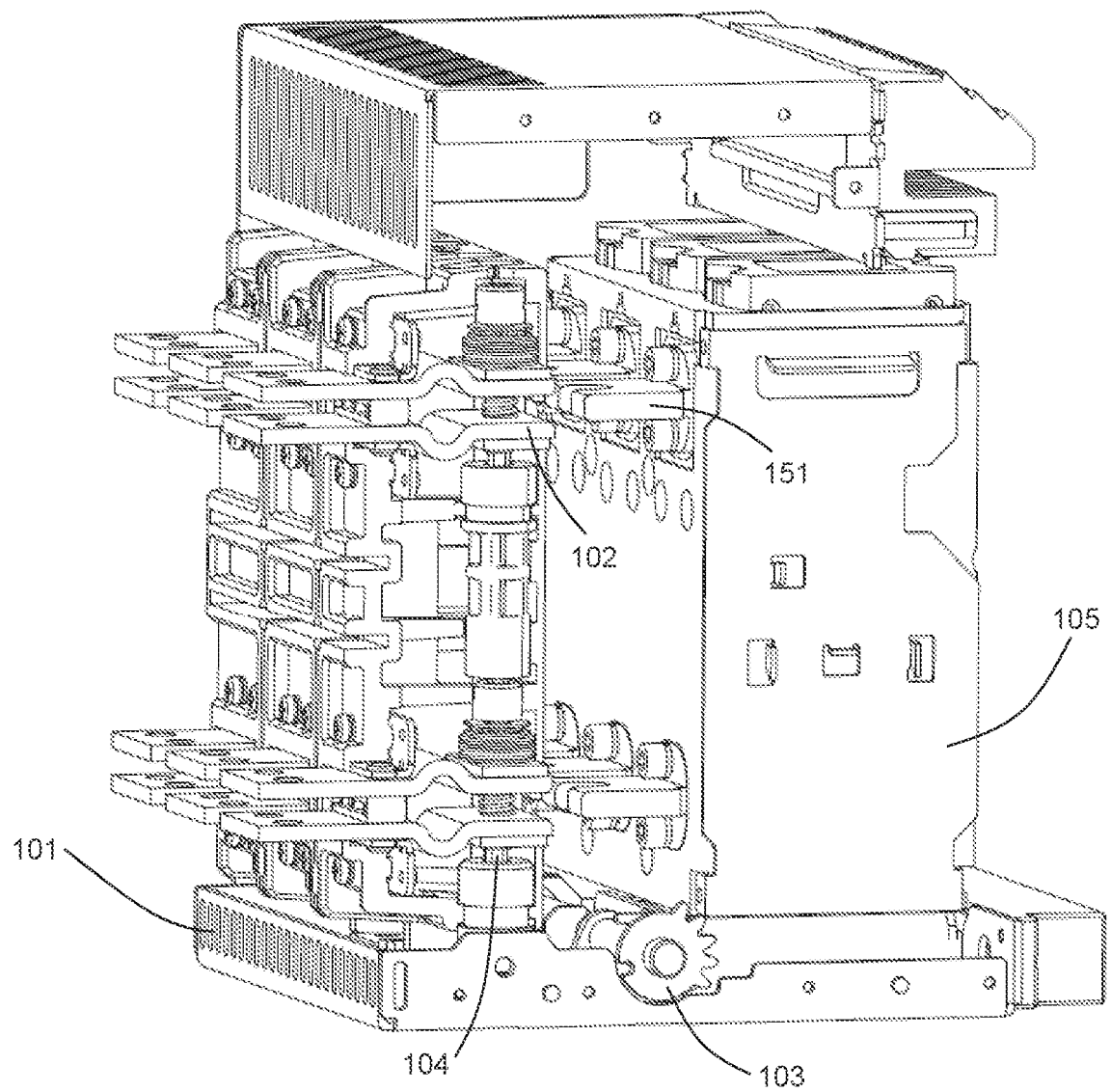
FIG. 1a and FIG. 1b illustrate structure diagrams of an electric switching apparatus, where
Figure 1B:
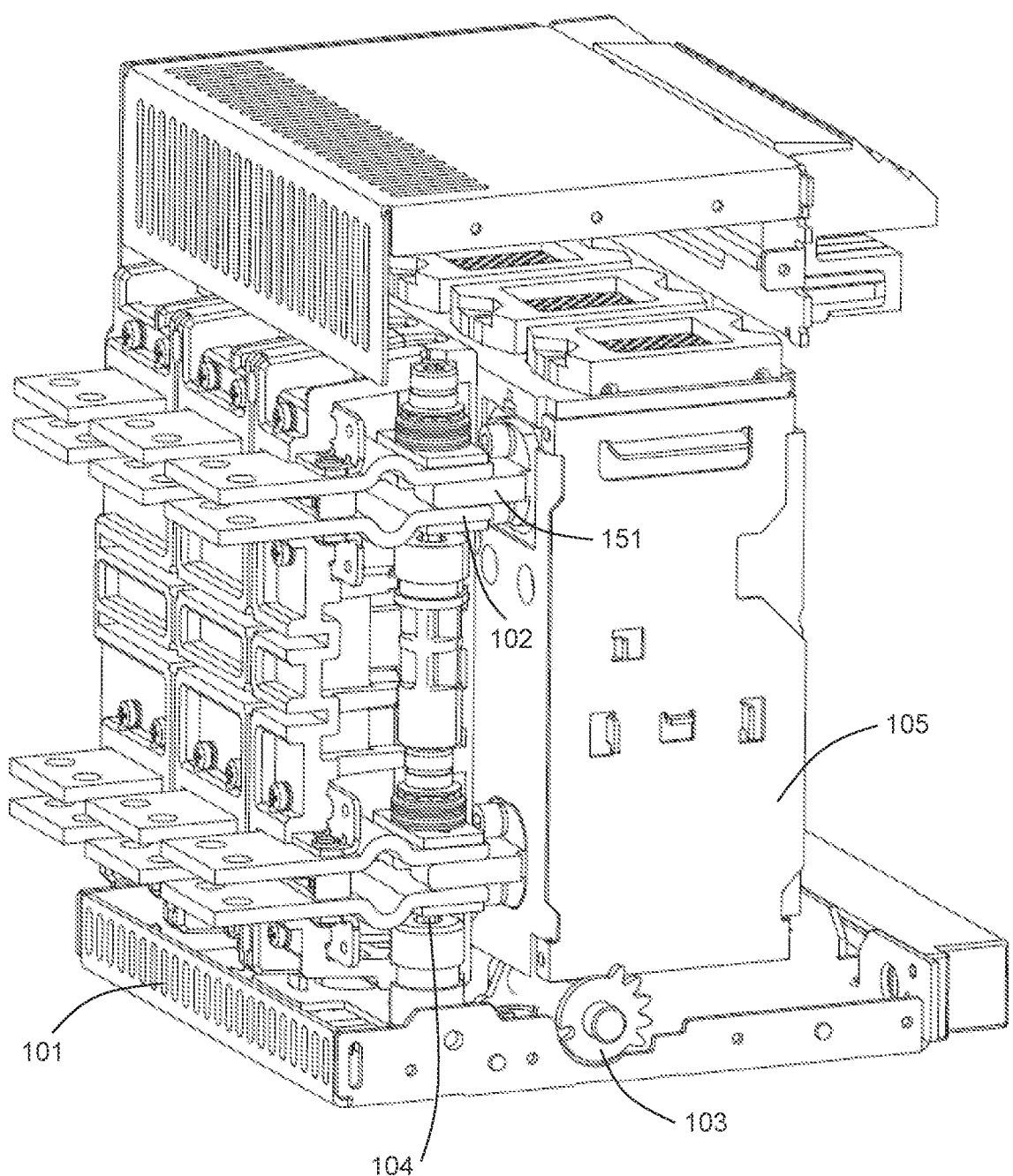

Embodiments of the present invention provide an electric switching apparatus. FIG. 1a and FIG. 1b illustrate structure diagrams of an electric switching apparatus. The electric switching apparatus comprises a drawer apparatus 101, an electric connection apparatus 102, a driving mechanism 103, a locking mechanism 104 and an interlocking mechanism. A breaker body 105 enters or exits the drawer apparatus 101. The electric connection apparatus 102 is installed on the drawer apparatus 101. The electric connection apparatus 102 includes a clamping mechanism, the electric connection apparatus 102 connects the busbar 151 of the breaker body 105 and external circuits. The driving mechanism 103 is installed on the drawer apparatus 101, the driving mechanism 103 drives the breaker body 105 to move, so that the busbar 151 of the breaker body enters or leaves the area of the electric connection apparatus 102. The locking mechanism 104 is installed on the drawer apparatus 101, the locking mechanism 104 drives the clamping mechanism of the electric connection apparatus 102, so that the electric connection apparatus 102 clamps or loosens the busbar 151 of the breaker body. The interlocking mechanism is mounted on the drawer apparatus, and the interlocking mechanism is not shown in FIG. 1a and FIG. 1b but will be shown in the subsequent drawings. The interlocking mechanism matches with the tripping rod of the breaker body to allow or prevent the breaker body from switching on. Compared with the electric switching apparatus used in the prior art, the electric switching apparatus of the present application uses the electric connection apparatus 102 of different structures. With regard to the specific structure of the electric connection apparatus 102, the applicant of the present application has submitted the patent applications with publication number CN111403939A and CN 111403938A and the patents with publication number CN211017487U and CN211045800U. The above-mentioned patent applications and patents are cited in the present application. With regard to the specific structure of the electric connection apparatus 102, reference can be made to the above-mentioned patent applications, which is not repeated herein. Due to the difference between the structure and working process of the electric connection apparatus and that in the prior art, the driving mechanism, the locking mechanism and the interlocking mechanism of the electric switching apparatus in this invention are also changed to adapt to the structural change of the electric connection apparatus. From the overall perspective, the most significant difference between the electric switching apparatus in this invention and the electric switching apparatus in the prior art is that the electric switching apparatus of this invention has four positions: a separation position, a trial position, a connected but not clamped position and a connected and clamped position. The electric switching apparatus in the prior art only has three positions: a separation position, a trial position and a connected position; this is because in the process of the busbar of the breaker body inserting into the electric connection apparatus, the being in place and the clamping of the busbar are completed synchronously. In the prior art, the circuit breaker body enters the connected position, the busbar inserted into the electric connection apparatus and is clamped. In the electric switching apparatus of the invention, the action of the busbar entering the electric connection apparatus and being clamped are carried out separately, therefore there are two positions in the connected state: connected but not clamped position and connected and clamped position. Although the electric switching apparatus of the invention has four positions, the basic principle of the connection process of the circuit breaker body and the drawer apparatus is still needed, that is, the safety is ensured by limiting the switching on function of the breaker body; the driving mechanism drives the breaker body to move, the relative position of the breaker body and the drawer apparatus includes:

the separation position, in which the breaker body is separated from the electric connection apparatus, and the breaker body cannot be switched on;

the trial position, in which the breaker body is separated from the electric connection apparatus, and the breaker body can be switched on;

the connected but not clamped position, in which the breaker body is in touch with the electric connection apparatus, the electric connection apparatus does not clamp the busbar, and the breaker body cannot be switched on;

the connected and clamped position, in which the breaker body is in touch with the electric connection apparatus, the electric connection apparatus clamps the busbar, and the breaker body can be switched on.

FIG. 1a and FIG. 1b illustrate structure diagrams of an electric switching apparatus, where FIG. 1a illustrates the state that the circuit breaker body has not entered the drawer apparatus, FIG. 1b illustrates the state that the circuit breaker body has entered the drawer apparatus.

The structure of the driving mechanism, the locking mechanism and the interlocking mechanism in the electric switching apparatus of the invention are respectively introduced below.

Figure 2A:
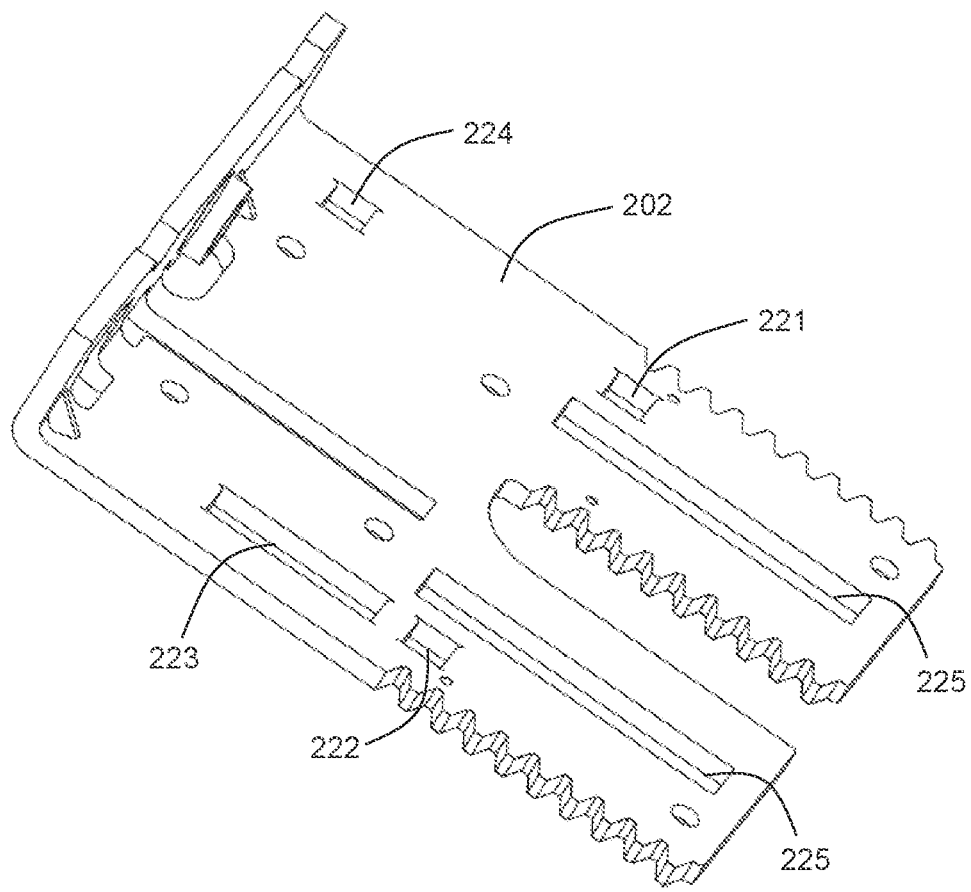
FIG. 2a, FIG. 2b, FIG. 2c and FIG. 2d illustrate structure diagrams of a driving mechanism in an electric switching apparatus according to an embodiment of the present invention.
Figure 2B:
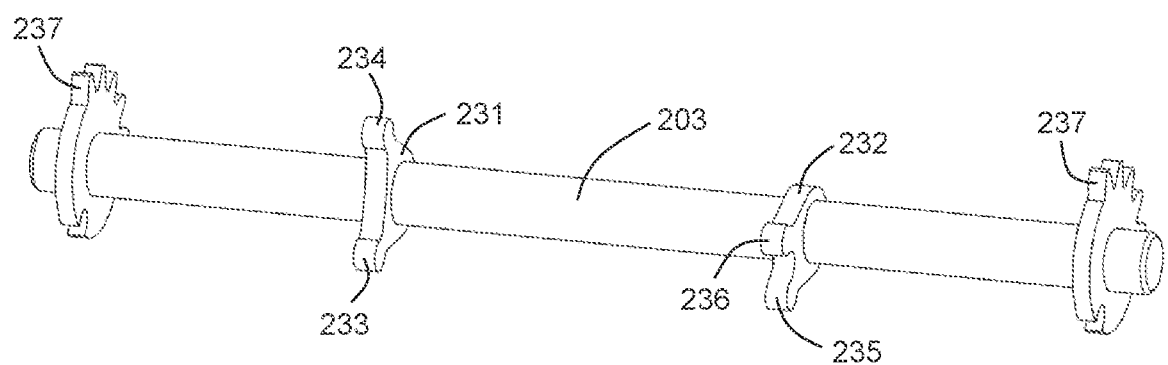
Figure 2C:
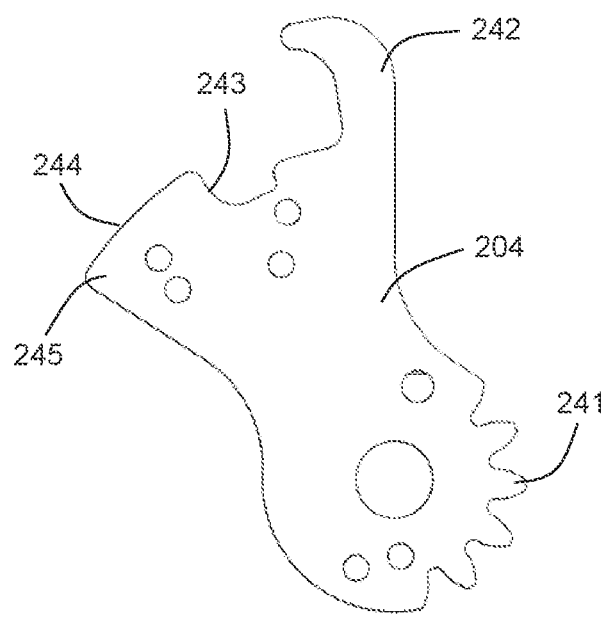
Figure 2D:
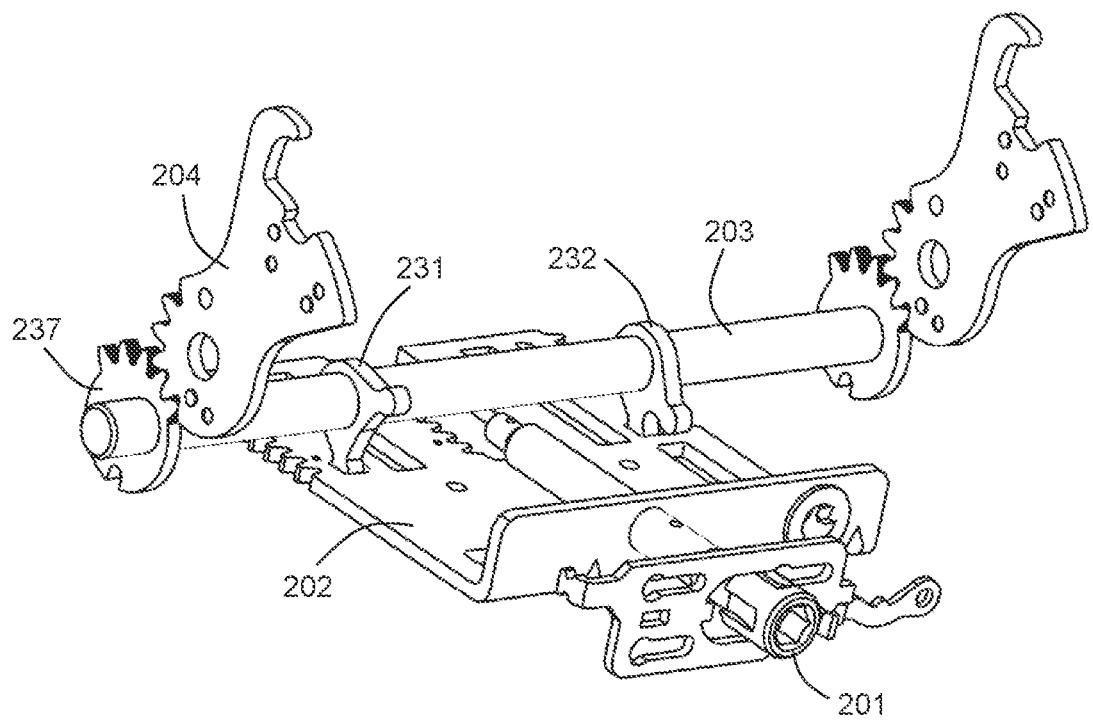

FIG. 2a, FIG. 2b, FIG. 2c and FIG. 2d illustrate structure diagrams of a driving mechanism in an electric switching apparatus according to an embodiment of the present invention. FIG. 2a illustrates the structure of the sliding plate, FIG. 2b illustrates the structure of the main shaft, FIG. 2c illustrates the structure of the supporting plate, and FIG. 2d illustrates the structure of the assembled driving mechanism. In one embodiment, the driving mechanism comprises: a driving shaft 201, a sliding plate 202, a main shaft 203 and a supporting plate 204. One end of the driving shaft 201 is connected to a handle (the handle is not shown in the figures) and the handle is rotated to drive the driving shaft to rotate. The sliding plate 202 is installed on the driving shaft 201, the rotation of the driving shaft is converted into the sliding of the sliding plate. The driving shaft 201 is driven by shaking the handle to rotate to drive the sliding plate 202 to move, the sliding plate 202 moves towards the inner side or the outer side of the drawer apparatus 101 to drive the breaker body 105 to enter or exit the drawer apparatus 101, and the connection mode of the driving shaft and the sliding plate is a conventional handle rocker structure. The connection method is commonly used in the art, and will not be described in detail herein. In addition, for the purposes of clarity and uniformity of description, the direction in the present invention is defined as follows: the direction of the drawer apparatus away from the breaker body is "outer side", and the direction of the drawer apparatus close to the breaker body is "inner side". The inward movement represents moving towards the inner side of the drawer apparatus, the outward movement represents a direction moving towards the opening of the drawer apparatus, the inner side end represents one end close to the inner side, and the outer side end represents one end close to the outer side. The main shaft 203 is mounted on the drawer apparatus 101, and the main shaft 203 can rotate and match with the sliding plate 202. The sliding plate 202 moves to a separation position, a trial position, a connected but not clamped position and a connected and clamped position, and the main shaft 203 correspondingly rotates to a separation angle, a trial angle, a connected but not clamped angle and a connected and clamped angle. The supporting plate 204 is mounted on the drawer apparatus 101, and the supporting plate 204 can rotate. The breaker body 105 is erected on the supporting plate 204, and the supporting plate 204 matches with the main shaft 203. The main shaft 203 rotates to the separation angle, the trial angle, the connected but not clamped angle and the connected and clamped angle, the supporting plate 204 correspondingly rotates to the separation angle, the trial angle, the connected but not clamped angle and the connected and clamped angle, and drives the breaker body 105 to the separation position, the trial position, the connected but not clamped position and the connected and clamped position.

As shown in FIG. 2a, FIG. 2b and FIG. 2d, the sliding plate 202 includes a first driving groove 221, a second driving groove 222, an unlocking groove 223 and an interlocking groove 224. A first cantilever 231 and a second cantilever 232 are installed on the main shaft 203. The first cantilever 231 includes a bifurcated first driving rod 233 and an interlocking rod 234, and the second cantilever 232 includes a bifurcated second driving rod 235 and an unlocking rod 236. As shown in the figures, the first driving groove 221 and the interlocking groove 224 are arranged along a straight line, and the first driving groove 221 and the interlocking groove 224 form drive coupling with the first driving rod 233 and the interlocking rod 234 on the first cantilever. The first driving rod 233 and the interlocking rod 234 match with the spacing of the first driving groove 221 and the interlocking groove 224 from the opening angle of the first cantilever 231. During action, the first driving rod 233 matches with the first driving groove 221, and the interlocking rod 234 matches with the interlocking groove 224. The second driving groove 222 and the unlocking groove 223 are also arranged along a straight line, and the second driving groove 222 and the unlocking groove 223 are in drive coupling with the second driving rod 235 and the unlocking rod 236 on the second cantilever. The opening angle of the second driving rod 235 and the unlocking rod 236 from the second cantilever 232 matches with the spacing between the second driving groove 222 and the unlocking groove 223. During action, the second driving rod 235 cooperates with the second driving groove 222, and the unlocking rod 236 cooperates with the unlocking groove 223. In the illustrated embodiment, the sliding plate 202 is further provided with a guide groove 225, and the guide groove 225 will guide when the sliding plate moves, and the sliding plate 202 moves along the guide groove 225.

With reference to FIG. 2b, FIG. 2c and FIG. 2d, a transmission gear 237 is mounted at both ends of the main shaft 203. The bottom of the supporting plate 204 is circular and has transmission teeth 241, the transmission teeth 241 are engaged with the transmission gear 237, and the main shaft 203 rotates to drive the supporting plate 204 to rotate. Since the main shaft 203 and the supporting plate 204 are driven by gear engagement, the rotation direction of the main shaft 203 and the supporting plate 204 is opposite. Referring to FIG. 2c, the inner side wall of the supporting plate 204 extends to the top to form an interlocking plate 242, the inner side end of the top of the supporting plate forms a driving groove 243, the outer side end of the top of the supporting plate forms a connecting surface 244, and a convex angle is formed in the top of the outer side wall of the supporting plate to form an exit driving part 245.

Figure 3:
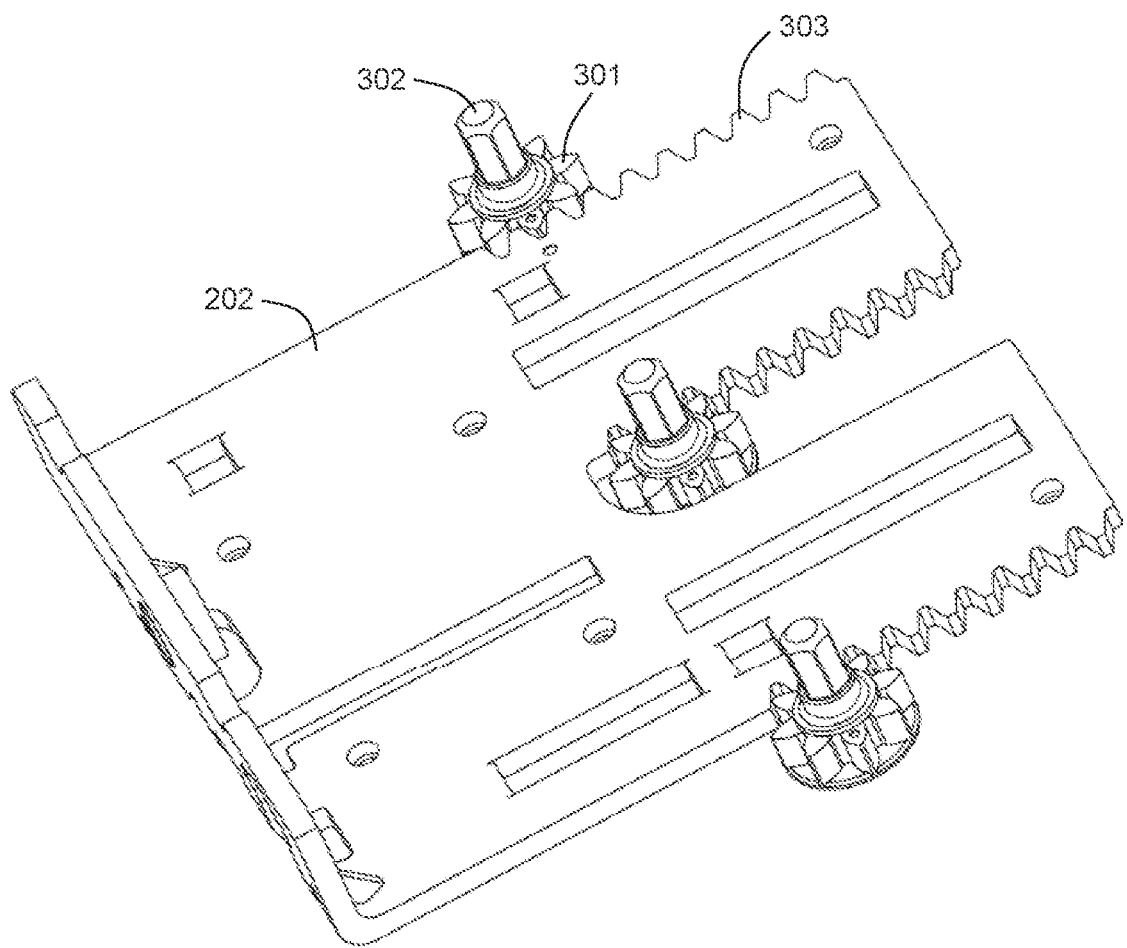
FIG. 3 illustrates a structure diagram of a locking mechanism in an electric switching apparatus according to an embodiment of the present invention.

FIG. 3 illustrates a structure diagram of a locking mechanism in an electric switching apparatus according to an embodiment of the present invention. The driving mechanism drives the locking mechanism to enable the locking mechanism to drive the clamping mechanism of the electric connection apparatus, and the electric connection apparatus clamps or releases the busbar of the breaker body. As shown in FIG. 3, the locking mechanism comprises a locking gear 301, a locking transmission shaft 302 and a locking rack 303. The locking gear 301 is mounted on the drawer apparatus, and the locking gear 301 can rotate. The locking transmission shaft 302 is connected to the locking gear 301 and the clamping mechanism of the electric connection apparatus 102. In the illustrated embodiment, the locking transmission shaft 302 is coaxial with the locking gear 301, and the locking transmission shaft 302 and the locking gear 301 rotate synchronously. The locking gear 301 rotates, the locking transmission shaft 302 rotates along with the locking gear 301, the locking transmission shaft 302 is connected to the clamping mechanism of the electric connection apparatus, and the locking transmission shaft 302 drives the clamping mechanism to clamp or loosen the busbar of the breaker body. The structure of the clamping mechanism of the electric connection apparatus clamping or releasing the circuit breaker busbar is described in the patent application or patent with publication number CN 111403939 A, CN 111403938 A, CN 211017487 U and CN 211045800 U. The locking rack 303 is formed on the sliding plate 202, and the locking rack 303 extends from the inner side end of the sliding plate 202 towards the outer side. The sliding plate moves towards the inner side, the locking rack 303 is in touch with and engaged with the locking gear 301, the locking gear is driven to rotate in the clamping direction, and the clamping mechanism is driven to clamp the busbar of the breaker body through the locking transmission shaft 302. The sliding plate moves to the outer side to drive the locking gear 301 to rotate in the loosening direction, and the locking transmission shaft 302 drives the clamping mechanism to loosen the busbar of the breaker body. The sliding plate 202 continues to move towards the outer side, since the position of the locking gear 301 is fixed, after the sliding plate 202 moves a sufficient distance to the outer side, the locking rack 303 is disengaged from the locking gear 301, the locking gear 301 no longer rotates, and the clamping mechanism of the electric connection apparatus no longer acts. In one embodiment, the locking rack and the locking gear can be also configured to be always engaged; correspondingly, the electric connection apparatus has a sufficiently large clamping stroke so as to meet the idling requirement of the electric connection apparatus when the busbar has not been inserted into the electric connection apparatus in the separation position and the trial position. Specifically, after the sliding plate 202 moves in place towards the outer side, the locking rack 303 can still be in touch and engaged with the locking gear 301. In this embodiment, the clamping stroke of the electric connection apparatus 102 needs to be large enough, during the moving process of the sliding plate in the separation position and the trial position, the electric connection apparatus 102 idly clamps but still has enough space, so that the breaker body busbar 151 does not get clamping force during entering the electric connection apparatus 102. The advantage of this embodiment is that the locking rack 303 and the locking gear 301 remain engaged, so that the whole system is always in a coupled state, so as to avoid the re-engagement of different parts being affected due to the assembly gap between the different parts. The embodiment has more stable working performance.

Figure 4:
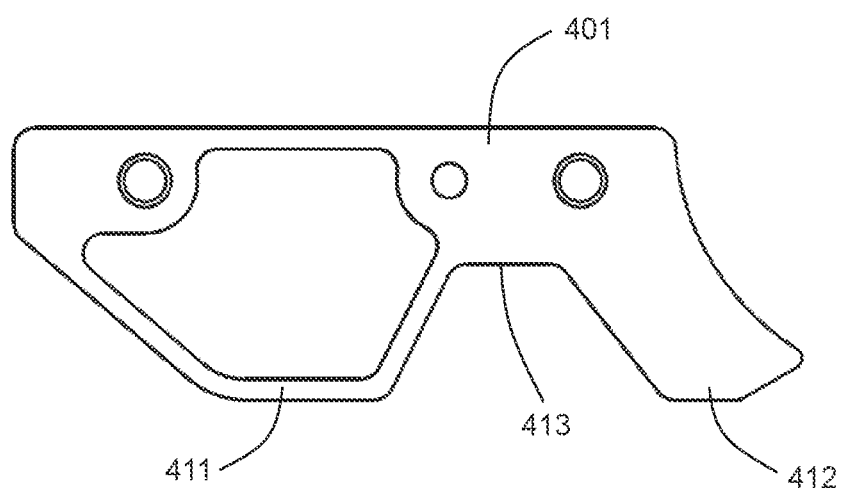
FIG. 4 illustrates a structure diagram of a drawer interlocking piece of an interlocking mechanism in an electric switching apparatus according to an embodiment of the present invention.
Figure 5:
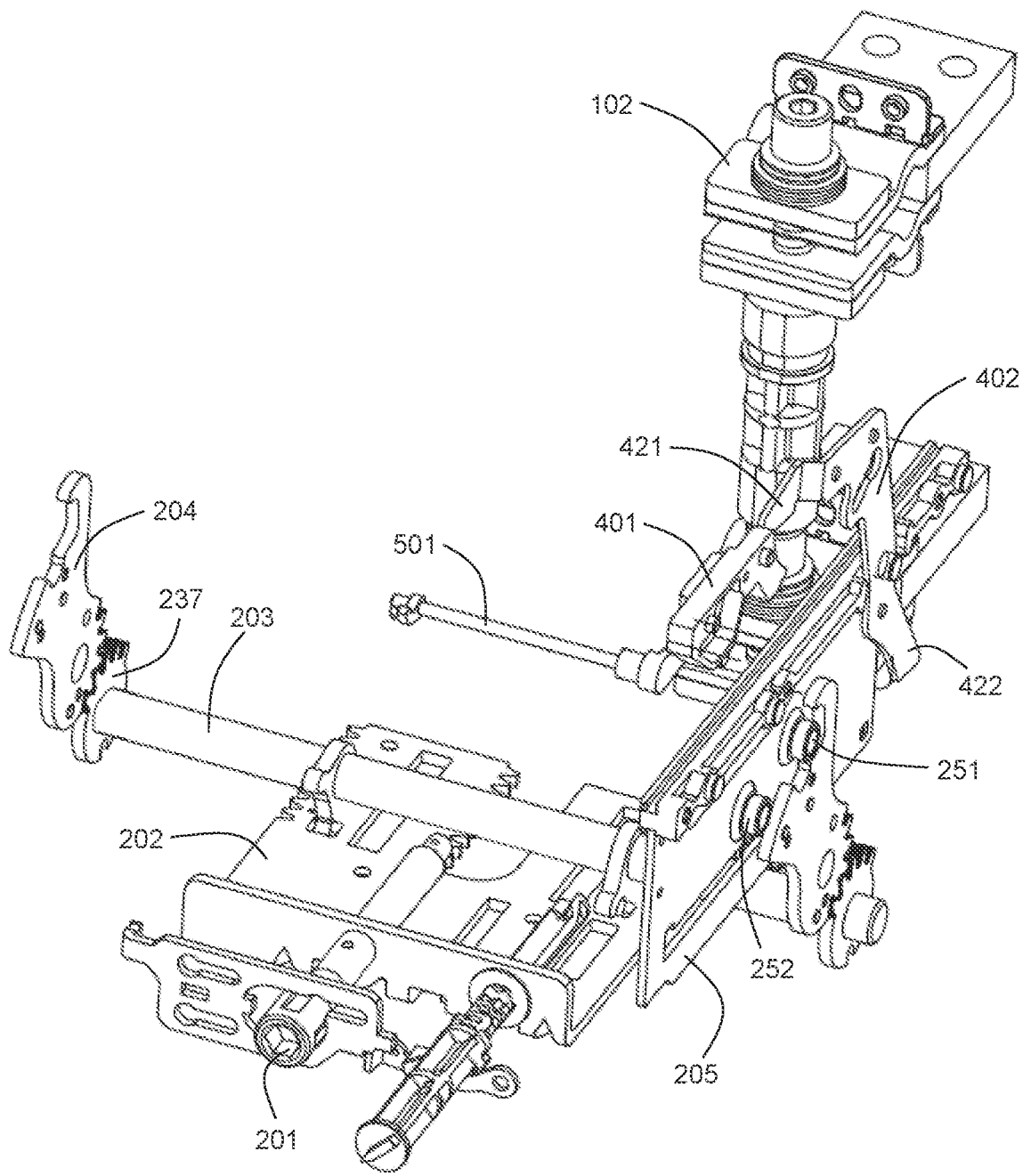
FIG. 5 illustrates an overall structure diagram of an electric switching apparatus according to an embodiment of the present invention.

The interlocking mechanism comprises a drawer interlocking piece 401, a drawer push rod 402 and an interlocking plate 242. FIG. 4 illustrates a structure diagram of a drawer interlocking piece of an interlocking mechanism in an electric switching apparatus according to an embodiment of the present invention. The drawer interlocking piece 401 is mounted on the drawer apparatus, and the mounting position of the drawer interlocking piece 401 is close to the outer side of the drawer apparatus 101. As shown in FIG. 4, the outer side end and the inner side end of the drawer interlocking piece 401 respectively form protruding interlocking parts 411 and 412, and a concave releasing part 413 is formed in the middle of the drawer interlocking piece. The drawer push rod 402 can be referred to in FIG. 5. FIG. 5 illustrates an overall structure diagram of an electric switching apparatus according to an embodiment of the present invention. The drawer push rod 402 is installed on the drawer apparatus, the drawer push rod 402 is located on the inner side of the drawer interlocking piece 401, and the middle of the drawer push rod 402 is rotatablely connected to the drawer apparatus through a rotating shaft. The top of the drawer push rod is a horizontal interlocking rod 421, the bottom of the drawer push rod is an inclined trigger rod 422, and the drawer push rod has an interlocking position and a release position. The interlocking rod 421 is pressed downward in the interlocking position and lifted upwards in the release position, the drawer push rod includes a push rod spring (not shown in the figures), the spring force of the push rod spring enables the drawer push rod to rotate towards the release position. The interlocking plate 242 is formed by the inner side wall of the supporting plate extending to the top, and the interlocking plate 242 may be referred in FIG. 2C.

FIG. 5 illustrates an overall structure diagram of an electric switching apparatus according to an embodiment of the present invention. The structure of the drawer apparatus and the breaker body are removed in FIG. 5, so as to illustrate the structure of the electric connection apparatus 102, the driving mechanism, the locking mechanism and the interlocking mechanism more clearly. Due to the observation angle, the locking gear and the locking transmission shaft in the locking mechanism are not shown in FIG. 5, but the locking rack located at the inner side end of the sliding plate is clearly visible. The driving shaft 201, the sliding plate 202, the main shaft 203 and the supporting plate 204 that have been assembled are shown in FIG. 5. In the embodiment shown in FIG. 5, the driving mechanism further comprises a side sliding plate 205, the side sliding plate 205 includes an entering shaft pin 251 and an exit shaft pin 252, and the breaker body is mounted on the side sliding plate 205. The entering shaft pin 251 and the exit shaft pin 252 of the side sliding plate 205 match with the supporting plate 204 to drive the breaker body to enter or exit the drawer apparatus. The position of the drawer interlocking piece 401 and the drawer push rod 402 are shown in FIG. 5, the drawer interlocking piece 401 and the drawer push rod 402 match with the tripping rod 501 on the breaker body, and the tripping rod 501 determines whether the breaker body can be switched on or not. The tripping rod 501 is locked, the breaker body cannot be switched on, the tripping rod 501 is released, and the breaker body can be switched on.

The states of the breaker body and the drawer apparatus in four relative positions are respectively described below. In the process of entering the drawer apparatus, the breaker body sequentially passes through a separation position, a trial position, a connected but not clamped position and a connected and clamped position.

Figure 6:
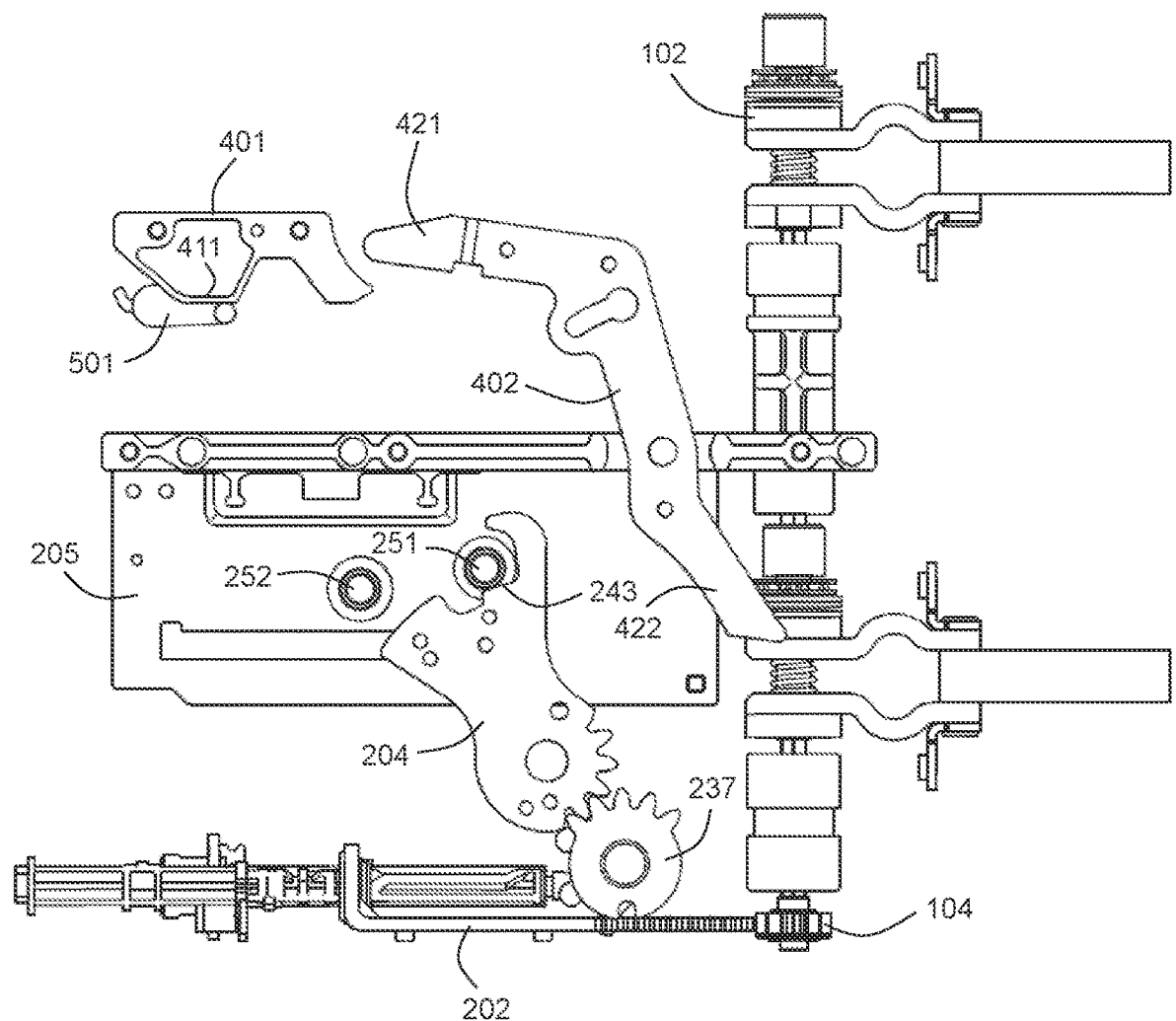
FIG. 6 illustrates a side structure diagram of an electric switching apparatus in the separation position according to an embodiment of the present invention.
Figure 7A:
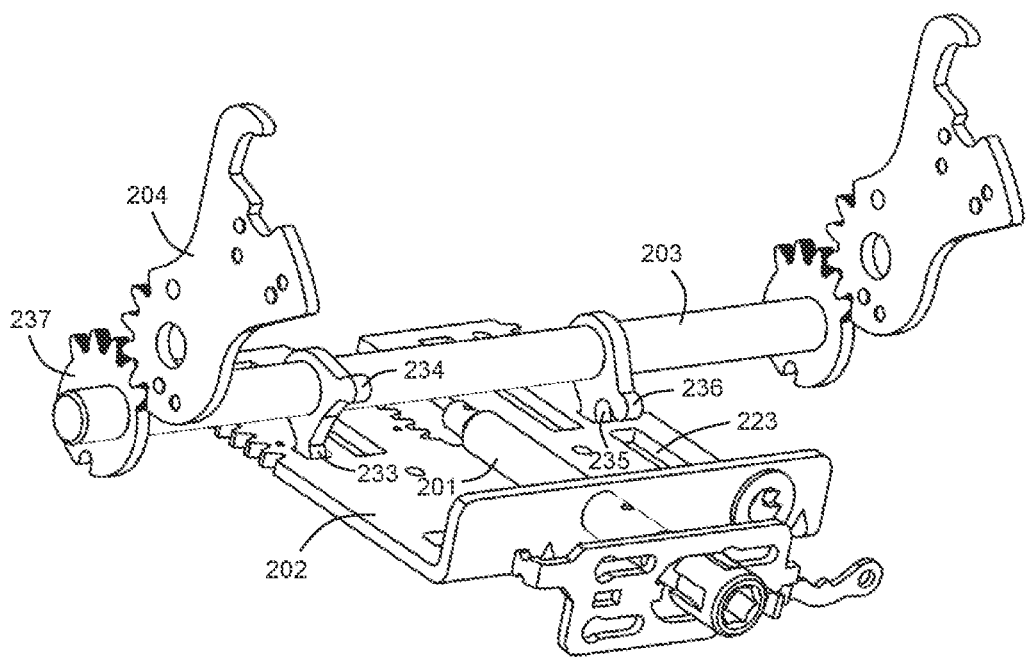
FIG. 7a and FIG. 7b illustrate structure diagrams of a driving mechanism in an electric switching apparatus in the separation position according to an embodiment of the present invention.
Figure 7B:
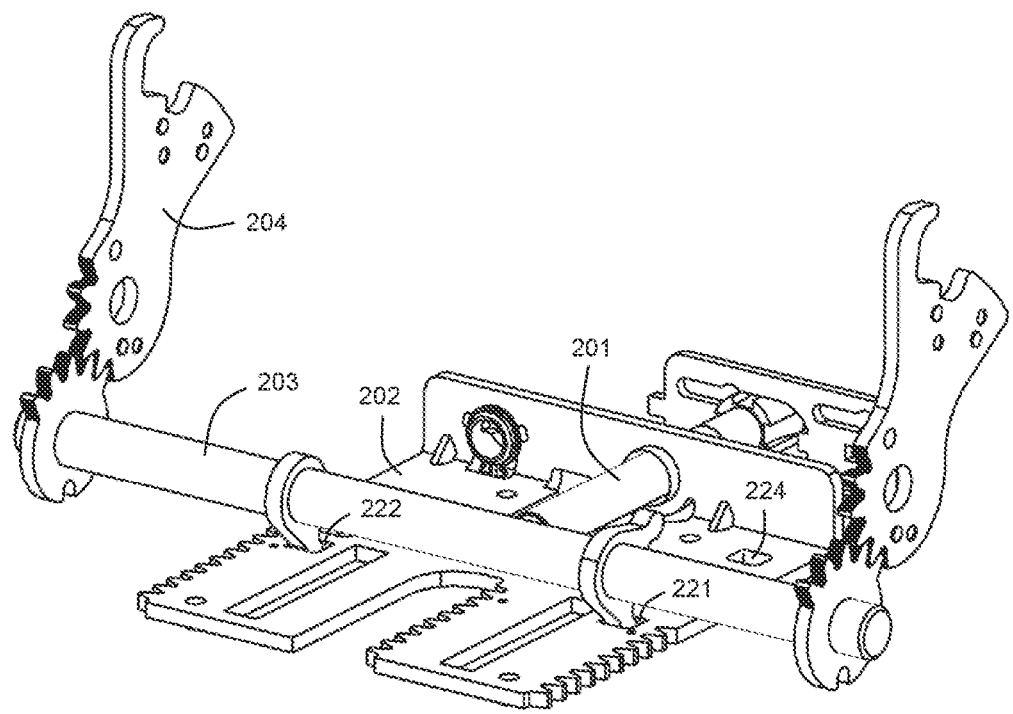

Firstly, it is about the separation position. When in the separation position, the requirement is that the busbar of the breaker body is separated from the electric connection apparatus, and the breaker body cannot be switched on. FIG. 6 illustrates a side structure diagram of an electric switching apparatus in the separation position according to an embodiment of the present invention. FIG. 7a and FIG. 7b illustrate structure diagrams of a driving mechanism in an electric switching apparatus in the separation position according to an embodiment of the present invention. As shown in FIG. 7a and FIG. 7b, in the separation position, the main shaft 203 is located at the separation angle, the first driving rod 233 is located in the first driving groove 221, and the second driving rod 235 is located in the second driving groove 222. The unlocking rod 236 and the unlocking groove 223 are separated from each other, and the interlocking rod 234 and the interlocking groove 224 are also separated from each other. With reference to FIG. 6, FIG. 7a and FIG. 7b, in the separation position, the main shaft 203 is located at the separation angle, and the supporting plate 204 is also located at the separation angle. An entering shaft pin 251 of the side sliding plate 205 is located in a driving groove 243 of the supporting plate 204. The breaker body placed on the side sliding plate is located in the separation position. In the separated position, the interlocking part 411 at the outer side end of the drawer interlocking piece 401 presses and locks the tripping rod 501, so that the breaker body cannot be switched on. In the separated position, the locking gear is disengaged from the locking rack, and therefore the locking mechanism does not act. As previously described, when the electric connection apparatus has a large enough clamping stroke, in some embodiments, the locking rack and the locking gear may be also configured to be always engaged.

Figure 8:
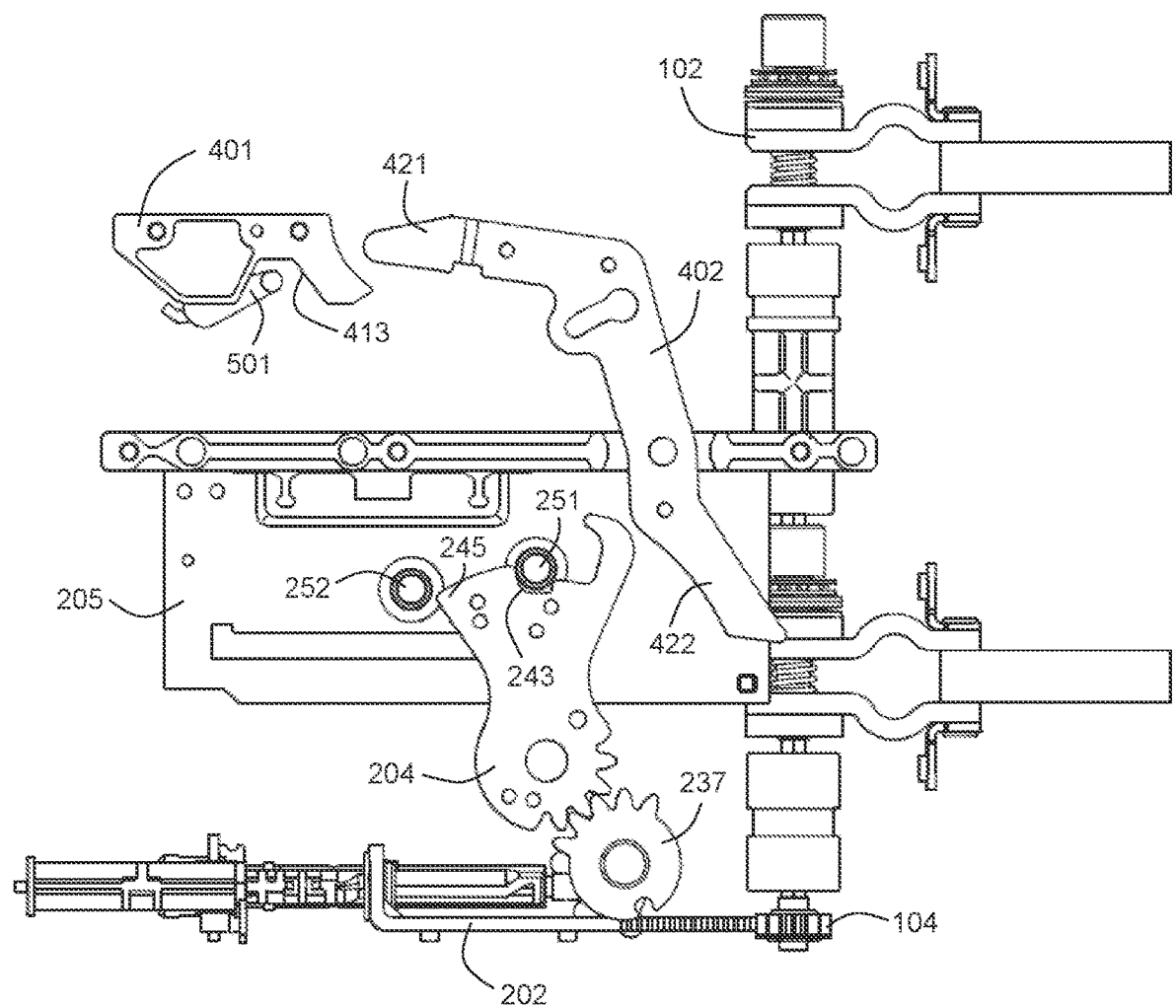
FIG. 8 illustrates a side structure diagram of an electric switching apparatus in the trial position according to an embodiment of the present invention.
Figure 9A:
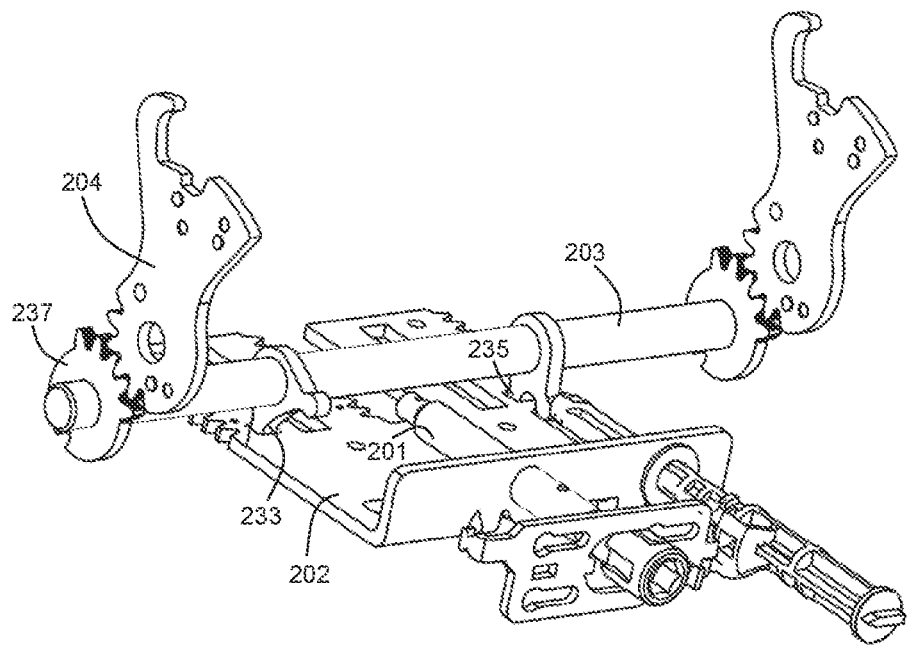
FIG. 9a and FIG. 9b illustrate structure diagrams of a driving mechanism in an electric switching apparatus in the trial position according to an embodiment of the present invention.
Figure 9B:
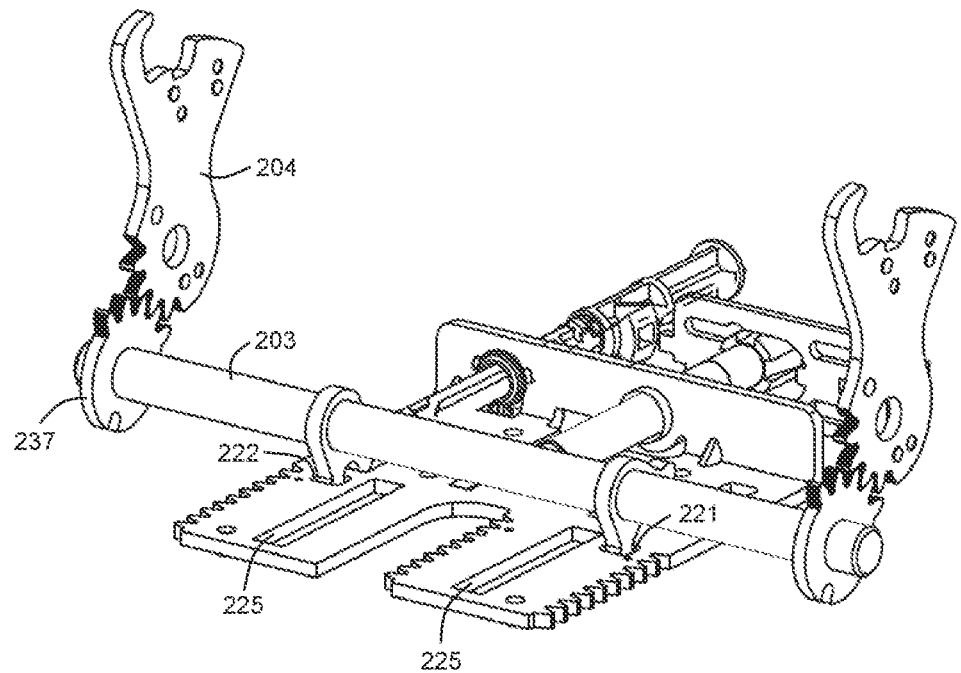

Then it is about the trial position. In the trial position, the requirement is that the busbar of the breaker body is separated from the electric connection apparatus, but the breaker body can be switched on. The trial position is mainly used to test the operation function of the electric switching apparatus for the breaker body, testing switching on operation and switching off operation, therefore the circuit breaker body needs to be able to be switched on and off in the trial position. However, the trial position is only a test for the operation function of the breaker body, and the breaker body has not been connected into the main loop, so the busbar of the breaker body is still separated from the electric connection apparatus. FIG. 8 illustrates a side structure diagram of an electric switching apparatus in the trial position according to an embodiment of the present invention. FIG. 9a and FIG. 9b illustrate structure diagrams of a driving mechanism in an electric switching apparatus in the trial position according to an embodiment of the present invention. As shown in FIG. 9a and FIG. 9b, in the process of moving from the separation position to the trial position, the sliding plate 202 moves along the guide groove 225 towards the inner side of the drawer apparatus under the action of the driving shaft 201, the outer side end of the first driving groove 221 pushes the first driving rod 233, and the outer side end of the second driving groove 222 pushes the second driving rod 235 to move under the pushing of the first driving groove and the second driving groove to drive the first cantilever and the second cantilever to move to drive the main shaft 203 to rotate, so that the main shaft 203 rotates from the separation angle to the trial angle. In this process, the unlocking rod does not act with the unlocking groove, and the interlocking rod does not act with the interlocking groove. In conjunction with FIG. 8, FIG. 9a and FIG. 9b, when moving from the separation position to the trial position, the main shaft 203 rotates from the separation angle to the trial angle, the supporting plate 204 engaged with the main shaft by means of the transmission gear 237 is also driven to rotate from the separation angle to the trial angle. It should be noted that since the supporting plate 204 and the main shaft 203 are driven by gear engagement, the rotation direction of the supporting plate and the main shaft is opposite, and when the main shaft rotates clockwise, the supporting plate rotates anti-clockwise. When the main shaft rotates anti-clockwise, the supporting plate rotates clockwise. The outer side end of the driving groove 243 of the supporting plate pushes the entering shaft pin 251 of the side sliding plate 205. The supporting plate rotates from the separation angle to the trial angle, and the side sliding plate 205 drives the breaker body to move from the separation position to the trial position. When moving from the separation position to the trial position, the breaker body moves towards the inner side, the tripping rod 501 also moves towards the inner side and enters the concave releasing part 413 in the middle of the drawer interlocking piece 401. The releasing part 413 is concave inwards, so the tripping rod 501 is released, the breaker body can perform switching on operation, and the requirement of the trial position is satisfied. In the trial position, the locking gear and the locking rack are still disengaged, so the locking mechanism will not act. As previously described, when the electric connection apparatus has a large enough clamping stroke, in some embodiments, the locking rack and the locking gear may also be configured to be always engaged.

Figure 10:
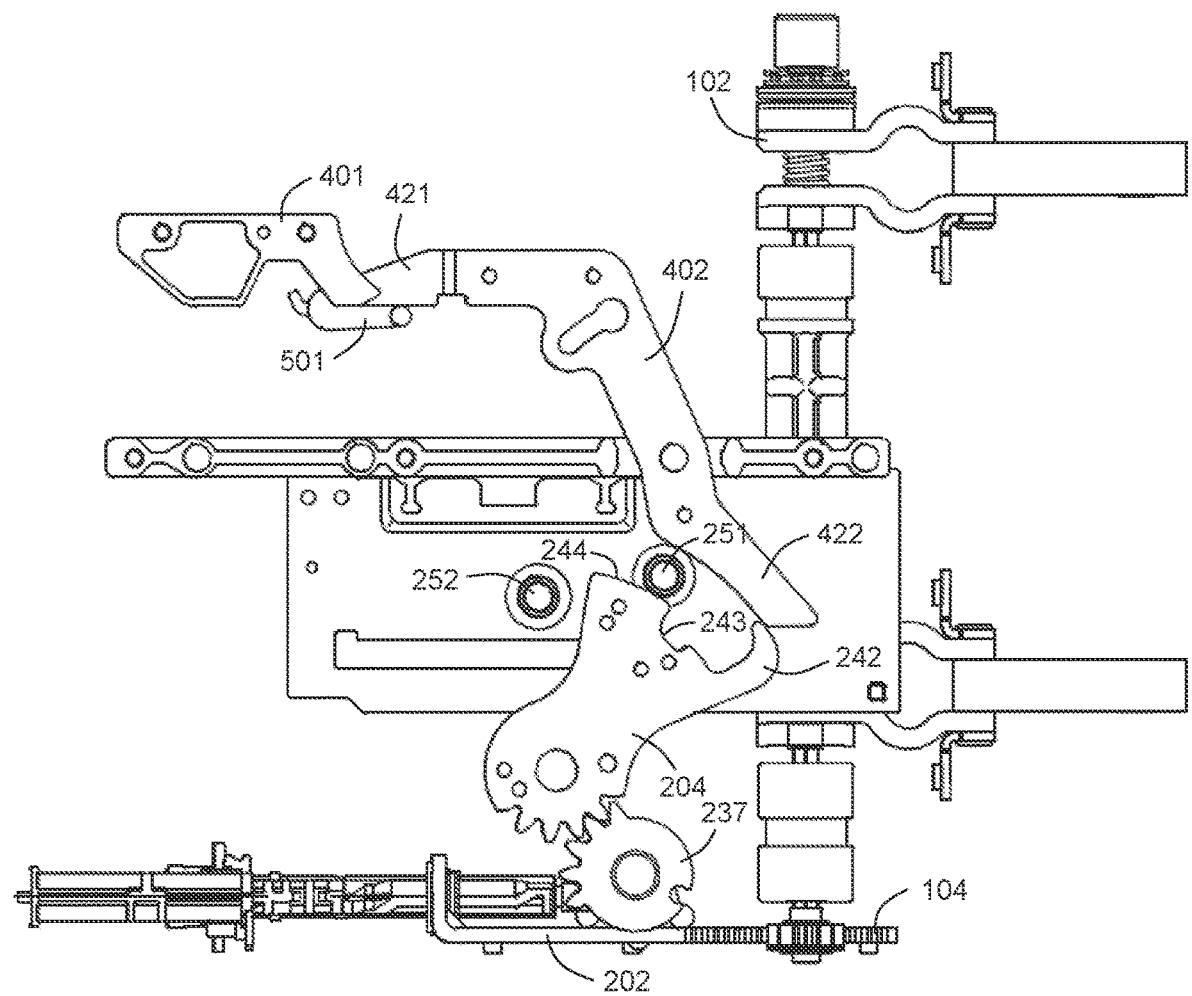
FIG. 10 illustrates a side structure diagram of an electric switching apparatus in the connected but not clamped position according to an embodiment of the present invention.
Figure 11A:
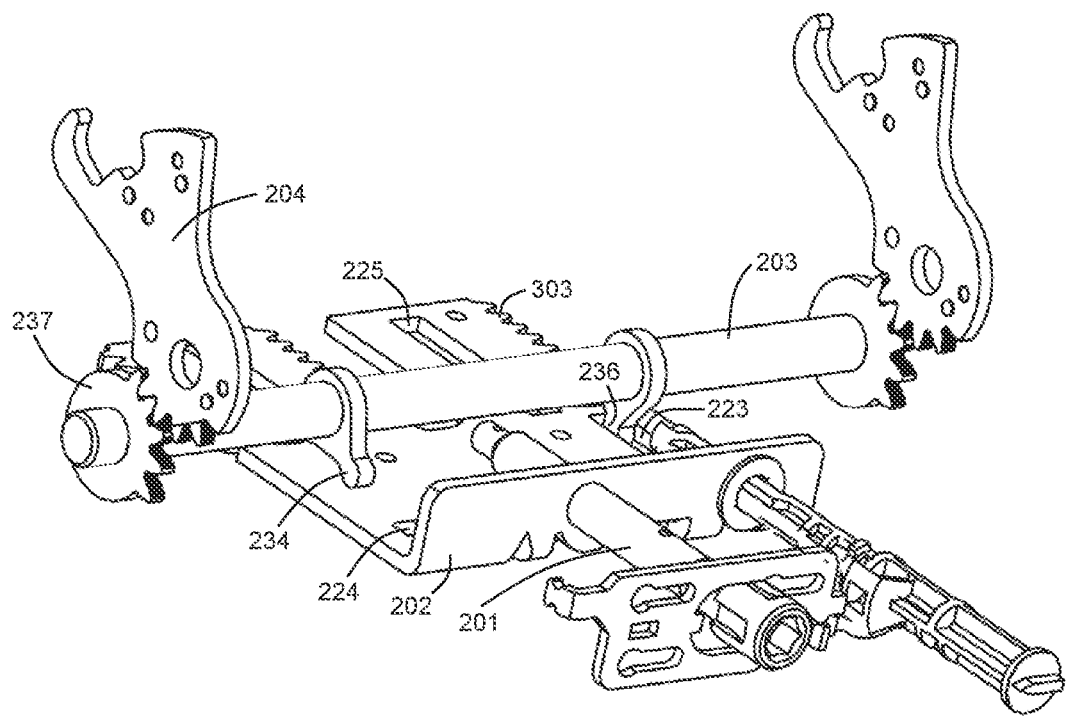
FIG. 11a and FIG. 11b illustrate structure diagrams of a driving mechanism in an electric switching apparatus in the connected but not clamped position according to an embodiment of the present invention.
Figure 11B:
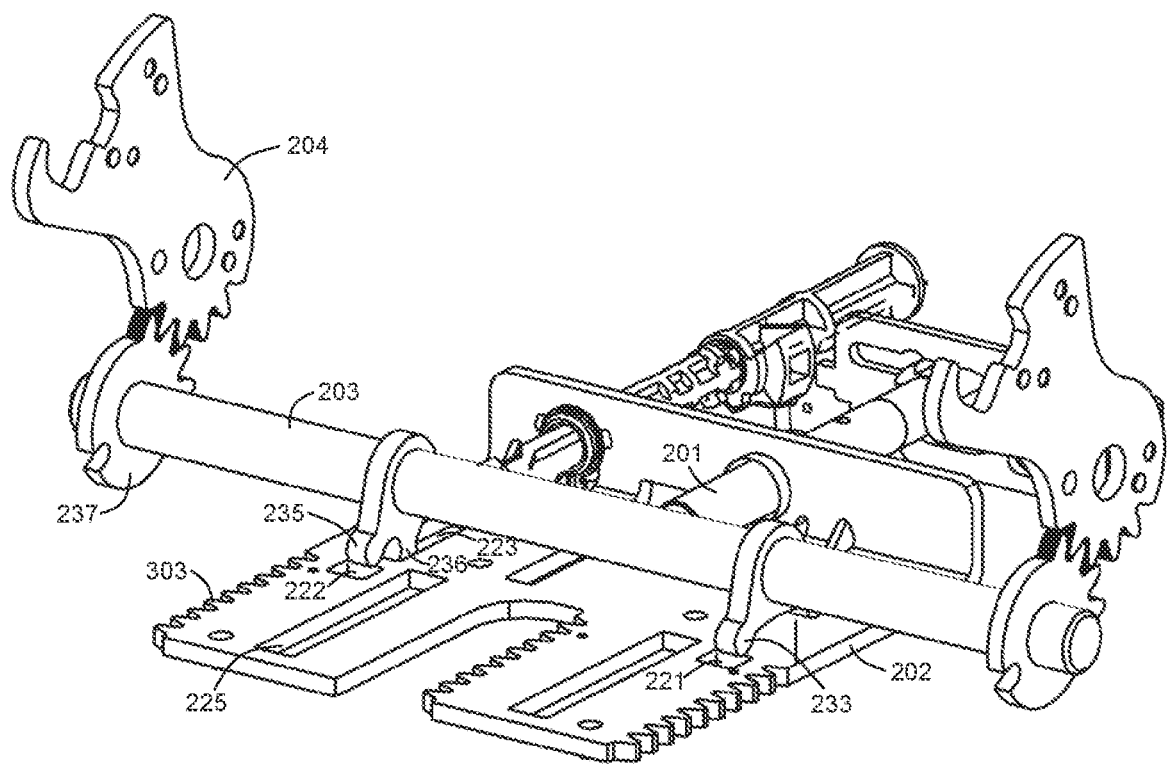

Next, it is about the connected but not clamped position, in the connected but not clamped position, the requirement is that the busbar of the breaker body touches the electric connection apparatus, but the electric connection apparatus does not clamp the busbar, and the breaker body cannot be switched on. From the trial position to the connected but not clamped position, the busbar of the breaker body begins to enter the area of the electric connection apparatus. However, before the busbar is fully inserted into the electric connection apparatus and is clamped, the main loop needs to remain disconnected, so that the breaker body cannot be switched on during the process. FIG. 10 illustrates a side structure diagram of an electric switching apparatus in the connected but not clamped position according to an embodiment of the present invention. FIG. 11a and FIG. 11b illustrate structure diagrams of a driving mechanism in an electric switching apparatus in the connected but not clamped position according to an embodiment of the present invention. As shown in FIG. 11a and FIG. 11b, in the process of moving from the trial position to the connected unclamped position, the sliding plate 202 continues to move along the guide groove 225 towards the inner side of the drawer apparatus under the action of the driving shaft 201. The outer side end of the first driving groove 221 pushes the first driving rod 233 until the first driving rod 233 is disengaged from the first driving groove 221 (referring to FIG. 11b). The outer side end of the second driving groove 222 pushes the second driving rod 235 until the second driving rod 235 is disengaged from the second driving groove 222 (referring to FIG. 11b). The main shaft 203 rotates to the connected but not clamped angle at this moment. The first driving rod and the second driving rod of the main shaft located at the connected but not clamped angle have been separately disengaged from the first driving groove and the second driving groove. The interlocking rod 234 has not entered the interlocking groove 224. Although the unlocking rod 236 has entered the unlocking groove 223, the unlocking groove 223 is a relatively long groove, so the unlocking rod 236 and the unlocking groove 223 do not act in this position. Thus, after reaching the connected but not clamped position, the sliding plate and the main shaft temporarily do not act with each other. In combination with FIG. 10, FIG. 11a and FIG. 11b, from the trial position to the connected but not clamped position, the main shaft 203 rotates from the trial angle to the connected but not clamped angle, the supporting plate 204 engaged with the main shaft by means of the transmission gear 237 is also driven to rotate from the trial angle to the connected but not clamped angle. In this process, the outer side end of the driving groove 243 pushes the entering shaft pin 251 of the side sliding plate 205, and the side sliding plate 205 drives the breaker body to move from the trial position to the unclamped position. When the main shaft and the supporting plate are both rotated to the connected but not clamped angle, and the side sliding plate and the breaker body also arrive at the connected but not clamped position, the entering shaft pin 251 disengages from the driving groove 243 and stays on the connecting surface 244 of the supporting plate 204. The connecting surface 244 is a continuous arc surface, so when the entering shaft pin 251 is located on the connecting surface 244, the continued rotation of the supporting plate 204 will not push the connecting shaft pin 251, that is, the supporting plate 204 continues to rotate, and the position of the side sliding plate and the breaker body no longer moves. During the process of moving from the trial position to the connected but not clamped position, the breaker body moves towards the inner side, the tripping rod 501 disengages from the releasing part 413 of the drawer interlocking piece 401, and is pressed and locked by the interlocking part 412 at the inner side end of the drawer interlocking piece again, so that the breaker body cannot be switched on. The breaker body continues to move inwards, the interlocking plate 242 on the supporting plate 204 rotates along with the supporting plate and is in touch with the trigger rod 422 of the drawer push rod 402. Under the action of the interlocking plate 242, the drawer push rod 402 overcomes the spring force of the push rod spring, from the release position to the interlocking position, the interlocking rod 421 of the drawer push rod 402 is pressed downward. The tripping rod 501 moves towards the inner side along with the breaker body, after the tripping rod 501 is separated from the drawer interlocking piece 401, the tripping rod 501 continues to be pressed downward and locked by the interlocking rod 421 of the drawer push rod 402, and the breaker body still remains the state that cannot being switched on. In the process of moving from the trial position to the connected but not clamped position, the locking mechanism has two implementation modes: in the first mode, in the process of moving from the trial position to the connected but not clamped position, the sliding plate 202 and the breaker body move towards the inner side, the busbar of the breaker body gradually enters the electric connection apparatus 102, the locking rack 303 engages with the locking gear 301, and as the sliding plate moves, the locking rack synchronously drives the locking gear to rotate in the clamping direction. The clamping mechanism of the electric connection apparatus 102 starts to clamp the busbar of the breaker body gradually. In the first mode, the length of the locking rack 303 is relatively long, and a relatively long distance is extended from the inner side end of the sliding plate. When the sliding plate passes through the trial position, the locking rack starts to engage with the locking gear, the action of the busbar of the breaker body entering the electric connection apparatus and the electric connection apparatus clamping the busbar are carried out synchronously. In the second mode, moving from the trial position to the connected but not clamped position, the sliding plate and the breaker body move towards the inner side, the busbar of the breaker body gradually enters the electric connection apparatus, but the locking rack and the locking gear are still disengaged from each other. In the second mode, the length of the locking rack 303 is relatively short, and a relatively short distance is extended from the inner side end of the sliding plate, before the sliding plate reaches the connected but not clamped position, the locking rack and the locking gear are always disengaged, the action of the busbar of the breaker body entering the electric connection apparatus and the electric connection apparatus clamping the busbar are carried out separately. As previously described, when the electric connection apparatus has a large enough clamping stroke, in some embodiments, the locking rack and the locking gear may also be configured to be always engaged.

Figure 12:
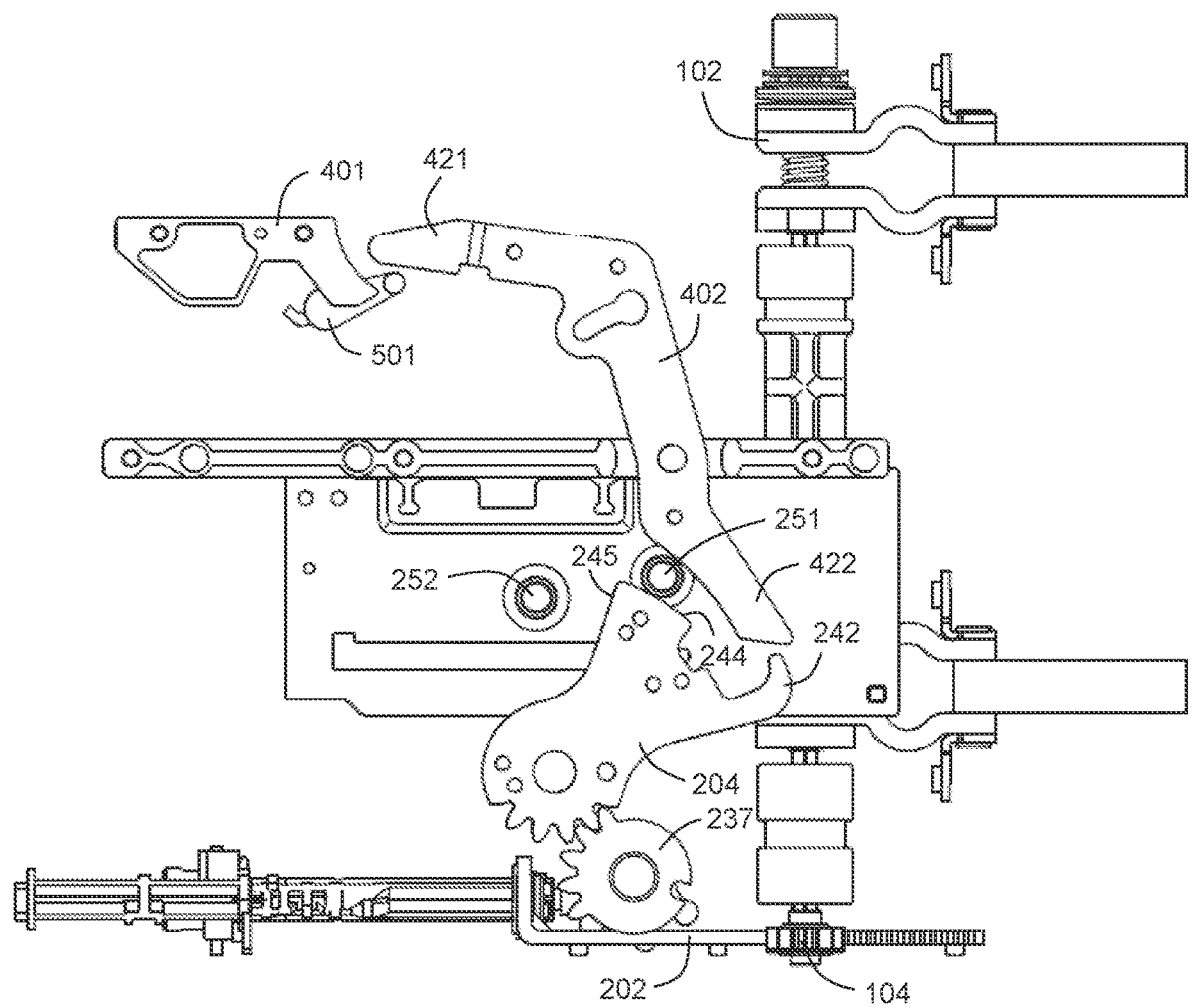
FIG. 12 illustrates a side structure diagram of an electric switching apparatus in the connected and clamped position according to an embodiment of the present invention.
Figure 13A:
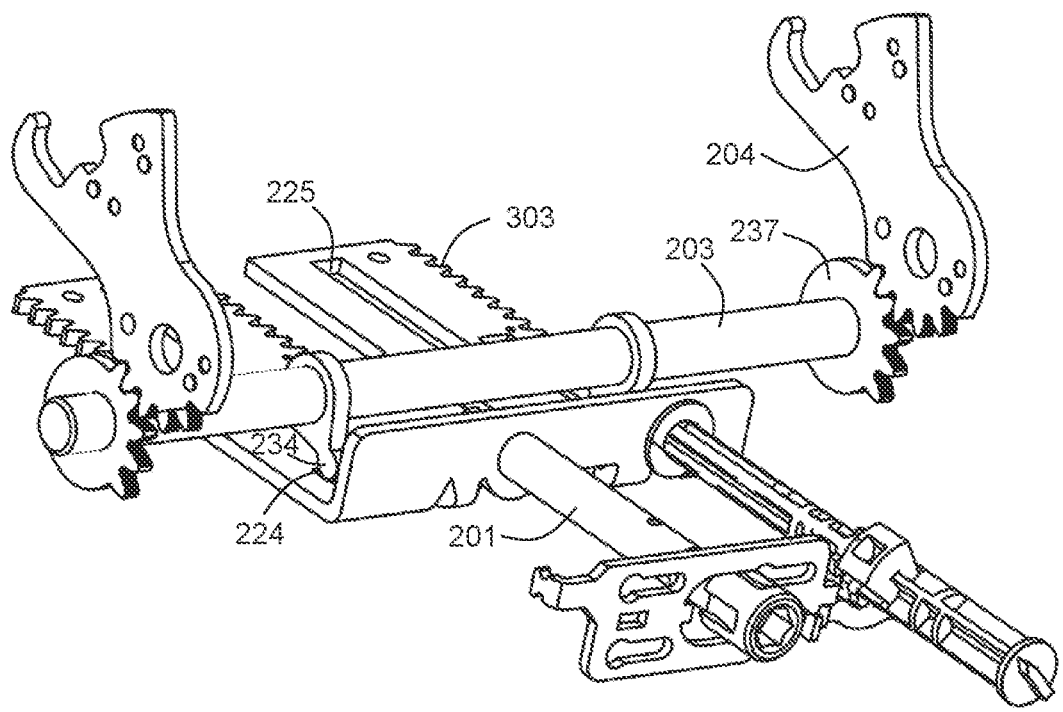
FIG. 13a and FIG. 13b illustrate structure diagrams of a driving mechanism in an electric switching apparatus in the connected and clamped position according to an embodiment of the present invention.
Figure 13B:
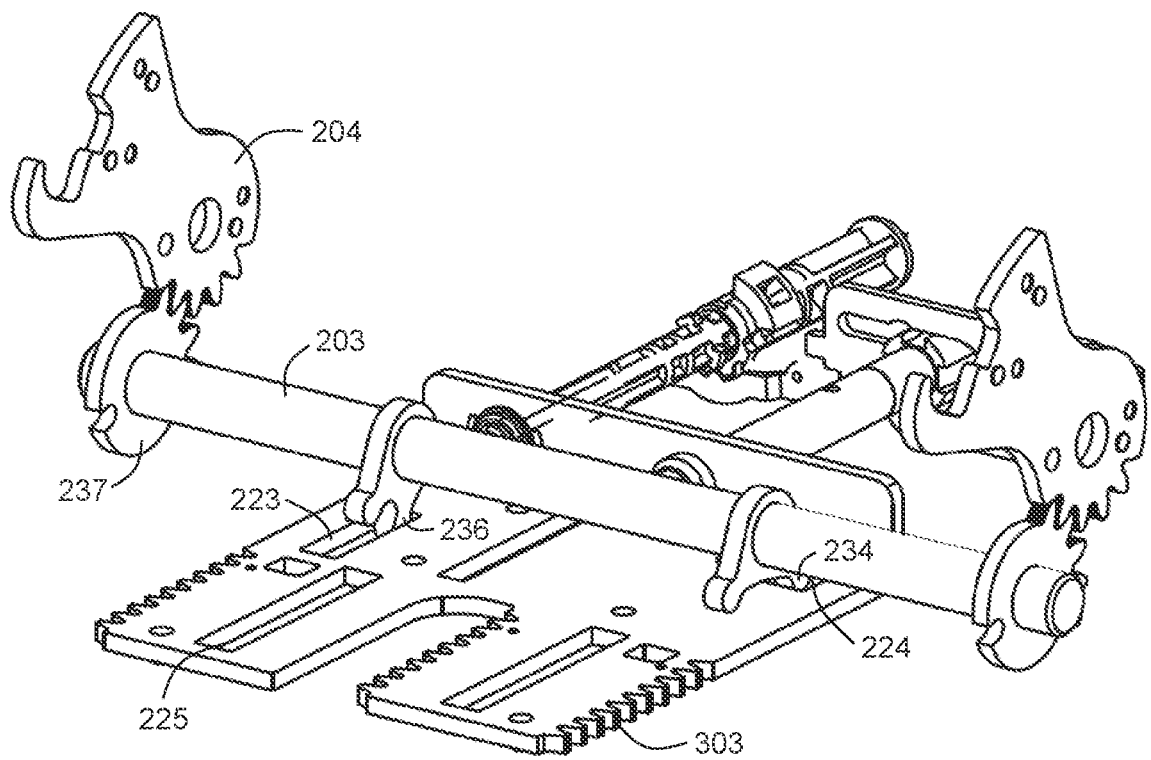

Finally, it is about the connected and clamped position. In the connected and clamped position, the requirement is that the busbar of the breaker body is in touch with the electric connection apparatus, and the electric connection apparatus clamps the busbar, the breaker body can be switched on. The connected and clamped position is the normally used position, the busbar of the breaker body makes full touch with the electric connection apparatus and is clamped, the breaker body is connected into the main loop and works normally, and therefore the breaker body can be switched on. FIG. 12 illustrates a side structure diagram of an electric switching apparatus in the connected and clamped position according to an embodiment of the present invention. FIG. 13a and FIG. 13b illustrate structure diagrams of a driving mechanism in an electric switching apparatus in the connected and clamped position according to an embodiment of the present invention. As shown in FIG. 13a and FIG. 13b, from the connected but not clamped position to the connected and clamped position, the sliding plate 202 continues to move towards the inner side of the drawer apparatus along the guide groove 225 under the action of the driving shaft 201. At this time, the unlocking rod 236 is located in the unlocking groove 223, and since the unlocking groove 223 is a relatively long groove, before the outer side end of the unlocking groove 223 contacts the unlocking rod 236, the sliding plate 202 and the main shaft 203 do not act with each other, and at this time, the sliding plate continues to move towards the inner side, so that the locking rack 303 arranged at the inner side end of the sliding plate drives the locking gear to rotate, so that the electric connection apparatus clamps the busbar of the breaker body. After the locking is in place, the sliding plate 202 moves to the connected and clamped position, and at this time, the outer side end of the unlocking groove 223 contacts and pushes the unlocking rod 236 to enable the main shaft 203 to rotate to the connected and clamped angle. Meanwhile, when the main shaft rotates to the connected and clamped angle, the interlocking rod 234 enters the interlocking groove 224, but the interlocking rod 234 does not act with the interlocking groove 224. The interlocking rod 234 enters the interlocking groove 224, so that the interlocking rod 234 and the interlocking groove 224 can be used to enable the breaker body to be locked again and not to be switched on when the breaker body exits. With reference to FIG. 12, FIG. 13a and FIG. 13b, after moving from the connected but not clamped position to the connected and clamped position, the main shaft 203 rotates from the connected but not clamped angle to the connected and clamped angle, the supporting plate 204 engaged with the main shaft by means of the transmission gear 237 is also driven to rotate from the connected but not clamped angle to the connected and clamped angle. In this process, the entering shaft pin 251 of the side sliding plate 205 slides on the connecting surface 244 of the supporting plate 204; the supporting plate 204 does not act with the entering shaft pin 251, therefore the side sliding plate and the breaker body do not move. During the process of moving from the connected but not clamped position to the connected and clamped position, the supporting plate 204 rotates from the connected but not clamped angle to the connected and clamped angle, although the interlocking plate 242 no longer acts with the side sliding plate, the interlocking plate 242 rotates along with the supporting plate 204 and is separated from the trigger rod 422 of the drawer push rod 402. At this time, the drawer push rod 402 rotates again from the interlocking position to the release position under the action of the push rod spring, the interlocking rod 421 of the drawer push rod 402 releases the tripping rod 501, and the breaker body can be switched on. For the locking mechanism, no matter which mode as stated above is used (locking rack is long or locking rack is short), the locking rack is engaged with the locking gear in the process of moving from the connected but not clamped position to the connected and clamped position. In this process, the breaker body does not move, the busbar of the breaker body completely enters the electric connection apparatus, the sliding plate 202 continues to move towards the inner side, the locking rack 303 engages with the locking gear, the locking gear is driven to continue to rotate in the clamping direction, and the clamping mechanism clamps the busbar of the breaker body.

Figure 14A:
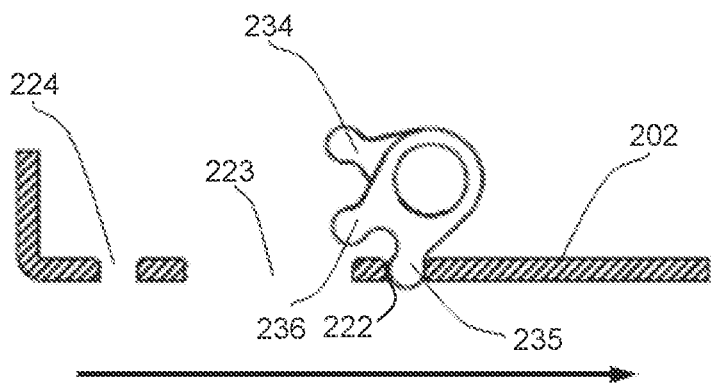
FIG. 14a, FIG. 14b, FIG. 14c and FIG. 14d illustrate a matching relationship between a sliding plate and a main shaft in different positions.
Figure 14B:
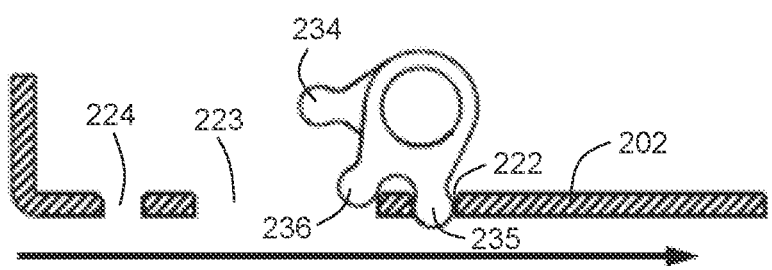
Figure 14C:
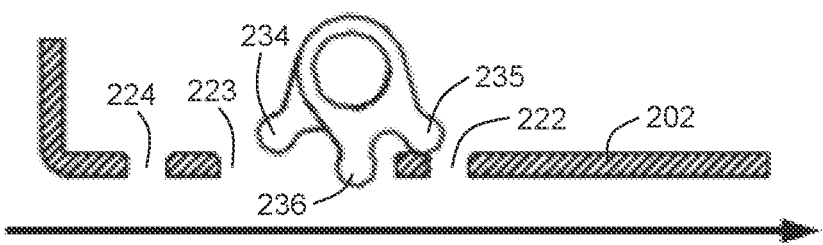
Figure 14D:
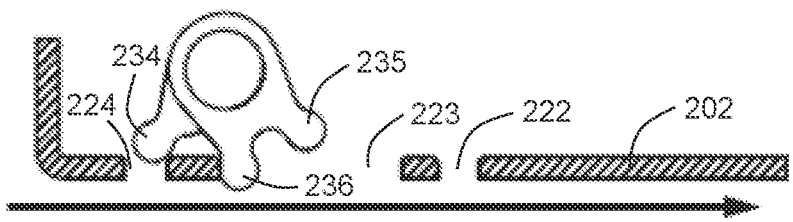

FIG. 14a, FIG. 14b, FIG. 14c and FIG. 14d illustrate a matching relationship between a sliding plate and a main shaft in different positions. The matching process of the first driving groove 221, the second driving groove 222, the unlocking groove 223 and the interlocking groove 224 on the sliding plate 202 and the first cantilever 231 of the main shaft, the first driving rod 233 of the second cantilever 232, the interlocking rod 234, the second driving rod 235 and the unlocking rod 236 in the push process of the breaker body is further displayed. In the separation position, referring to FIG. 14a, the main shaft is located at the separation angle, the first driving rod is located in the first driving groove (the first driving rod and the first driving groove are shielded in FIG. 14a due to observation angle), the second driving rod 235 is located in the second driving groove 222, the unlocking rod 236 is separated from and does not act with the unlocking groove 223, and the interlocking rod 234 is separated from and does not act with the interlocking groove 224. From the separation position to the trial position, as shown in FIG. 14b, the sliding plate 202 moves towards the inner side of the drawer apparatus, and the direction indicated by the arrow in FIG. 14a, FIG. 14b, FIG. 14c and FIG. 14d is the moving direction of the sliding plate 202. The outer side end of the first driving groove pushes the first driving rod (the first driving rod and the first driving groove are shielded in FIG. 14b due to observation angle), the outer side end of the second driving groove 222 pushes the second driving rod 235, so that the main shaft rotates to the trial angle, the unlocking rod 236 does not act with the unlocking groove 223, and the interlocking rod 234 also does not act with the interlocking groove 224. From the trial position to the connected but not clamped position, referring to FIG. 14c, the sliding plate 202 continues to move towards the inner side of the drawer apparatus, and the outer side end of the first driving groove pushes the first driving rod until the first driving rod is disengaged from the first driving groove (the first driving rod and the first driving groove are shielded in FIG. 14c due to observation angle), The outer side end of the second driving groove 222 pushes the second driving rod 235 until the second driving rod is disengaged from the second driving groove, so that the main shaft is rotated to the connected but not clamped angle. At this time, the unlocking rod 236 enters the unlocking groove 223, but the unlocking groove 223 is a relatively long groove, so the unlocking rod 236 does not act with the unlocking groove 223, and the interlocking rod 234 does not enter the interlocking groove 224, so the interlocking rod 234 also does not act with the interlocking groove 224. From the connected but not clamped position to the connected and clamped position, referring to FIG. 14d, the sliding plate 202 continues to move towards the inner side of the drawer apparatus, and the outer side end of the unlocking groove 223 contacts the unlocking rod 236 and pushes the unlocking rod 236 to enable the main shaft to rotate to the connected and clamped angle. When the main shaft rotates to the connected and clamped angle, the interlocking rod 234 enters the interlocking groove 224, but the interlocking rod 234 does not act with the interlocking groove 224. The interlocking rod 234 enters the interlocking groove 224, so that the inner side end of the interlocking groove 224 can act on the interlocking rod 234 to enable the tripping rod of the breaker body to be locked and not to be switched on when the interlocking rod 234 exits.

The process of the breaker body exiting the drawer apparatus is just opposite to the process described above, and sequentially passes through the connected and clamped position, the connected but not clamped position, the trial position and the separation position.

In the connected and clamped position, referring to FIG. 12, FIG. 13a and FIG. 13b, the main shaft 203 is located at the connected and clamped angle, the interlocking rod 234 is located in the interlocking groove 224, the unlocking rod 236 is located in the unlocking groove 223, the first driving rod does not act with the first driving groove, and the second driving rod does not act with the second driving groove. In the connected and clamped position, the main shaft 203 is located at the connected and clamped angle, the supporting plate 204 is also located at the connected and clamped angle, the entering shaft pin 251 of the side sliding plate 205 is located on the connecting surface 244 of the supporting plate 204, and the exit shaft pin 252 of the side sliding plate 205 is also not in touch with the supporting plate 204. In the connected and clamped position, the interlocking plate 242 is separated from the trigger rod 422 of the drawer push rod 402, the drawer push rod 402 is located at the release position under the action of the push rod spring, the interlocking rod 421 is lifted upwards, the tripping rod 501 is released, and the breaker body can be switched on.

When moving from the connected and clamped position to the connected but not clamped position, referring to FIG. 10, FIG. 11a and FIG. 11b, the sliding plate 202 moves along the guide groove 225 towards the outer side of the drawer apparatus under the action of the driving shaft 201, and the inner side end of the interlocking groove 224 pushes the interlocking rod 234 until the interlocking rod 234 disengages from the interlocking groove 224, so that the main shaft 203 rotates to the connected but not clamped angle. Before the main shaft rotates to the connected but not clamped angle, the unlocking rod 236 is only located in the unlocking groove 223, but the unlocking rod 236 does not act with the unlocking groove 223. The first driving rod does not act with the first driving groove, and the second driving rod does not act with the second driving groove. From the connected and clamped position to the connected but not clamped position, the main shaft 203 is rotated from the connected and clamped angle to the connected but not clamped angle and the supporting plate 204 engaged with the main shaft by means of the transmission gear 237 is also driven to rotate from the connected and clamped angle to the connected but not clamped angle. The entering shaft pin 251 slides on the connecting surface 244 of the supporting plate 204, the exit shaft pin 252 is not in touch with the supporting plate 204, the supporting plate 204 does not act with the entering shaft pin 251 and the exit shaft pin 252, both the side sliding plate 205 and the breaker body do not move. Moving from the connected and clamped position to the connected but not clamped position, although the side sliding plate 205 and the breaker body do not move, the interlocking plate 242 rotates along with the supporting plate 204 and is in touch with the trigger rod 422 of the drawer push rod 402, the drawer push rod 402 overcomes the spring force of the push rod spring under the action of the interlocking plate 242, the drawer push rod 402 rotates to the interlocking position from the release position, the interlocking rod 421 of the drawer push rod 402 presses downward and locks the tripping rod 501, and the breaker body cannot be switched on. Moving from the connected and clamped position to the connected but not clamped position, the side sliding plate and the breaker body do not move, the sliding plate moves to the outer side, the locking rack 303 engages with the locking gear, and the locking rack 303 drives the locking gear to rotate in the loosening direction, so that the clamping mechanism loosens the busbar of the breaker body. In the mode of using a relatively short locking rack (corresponding to the second mode described above), when reaching the connected but not clamped position, the locking rack disengages from the locking gear, the action of the electric connection apparatus loosening the busbar and the busbar of the breaker body exiting the electric connection apparatus are carried out separately. In the mode of using a relatively long locking rack (corresponding to the first mode described above), when reaching the connected but not clamped position, the locking rack is still engaged with and is not separated from the locking gear, the action of the electric connection apparatus loosening the busbar and the busbar of the breaker body exiting the electric connection apparatus are carried out synchronously. As previously described, when the electric connection apparatus has a large enough clamping stroke, in some embodiments, the locking rack and the locking gear may also be configured to be always engaged. If they are always in the configuration of engagement, the locking rack and the locking gear are not separated from each other.

When moving from the connected but not clamped position to the trial position, referring to FIG. 8, FIG. 9a and FIG. 9b, the sliding plate 202 moves along the guide groove 225 towards the outer side of the drawer apparatus under the action of the driving shaft 201, and the inner side end of the unlocking groove 223 pushes the unlocking rod 236, so that the main shaft 203 rotates from the connected but not clamped angle to the trial angle. In this process, the first driving rod 233 enters the first driving groove 221, and the second driving rod 235 enters the second driving groove 222. The inner side end of the unlocking groove 223 continuously pushes the unlocking rod 236 until the unlocking rod 236 disengages from the unlocking groove 233, then, the inner side end of the first driving groove 221 continues to push the first driving rod 233, and the inner side end of the second driving groove 222 continues to push the second driving rod 235, so that the main shaft 203 continuously rotates until the trial angle is reached. From the connected but not clamped position to the trial position, the main shaft 203 rotates from the connected but not clamped angle to the trial angle, and the supporting plate 204 engaged with the main shaft by means of the transmission gear 237 is also driven to rotate from the connected but not clamped angle to the trial angle. The exit driving part 245 of the supporting plate 204 contacts and pushes the exit shaft pin 252, so that the side sliding plate 205 drives the breaker body to move to the outer side, and meanwhile, the entering shaft pin 251 enters the driving groove 243 from the connecting surface of the supporting plate. The supporting plate 204 continues to rotate, the exit shaft pin 252 is separated from the exit driving part 245 of the supporting plate, and then the inner side end of the driving groove 243 of the supporting plate is pushed to enter the shaft pin 251, so that the side sliding plate 205 drives the breaker body to continue to move to the trial position. In another embodiment, the exit shaft pin 252 can also be always pushed by the exit driving part 245 until reaches the trial position, and the entering shaft pin 251 does not participate in the exit process. Moving from the trial position to the separation position, the breaker body moves to the outer side, the tripping rod 501 disengages from the releasing part 413 of the drawer interlocking piece 401 and be locked by the interlocking part 411 at the outer side end of the drawer interlocking piece, and the breaker body cannot be switched on. From the trial position to the separation position, the locking rack disengages from the locking gear, the locking mechanism does not act. As previously described, when the electric connection apparatus has a large enough clamping stroke, in some embodiments, the locking rack and the locking gear may also be configured to be always engaged. If they are always in the configuration of engagement, the locking rack and the locking gear are not separated from each other.

The electric switching apparatus provided by the invention has an electric connection apparatus of new structure, the electric connection apparatus can be configured with a large clamping force to clamp the body busbar according to the requirements, so that the overall contact resistance of the electric apparatus is reduced. Especially in the long-term use, the power consumption is reduced, and the use cost is saved. The higher the rated current is, the more significant this advantage is. On the other hand, the reduction in contact resistance reduces the temperature rise of the product and the heat generation of the electric apparatus. It is no longer necessary to consider a large heat dissipation space, which is effective in reducing the size of the product and improving the reliability of long-term use. According to the electric switching apparatus disclosed in the invention provides the drawer apparatus, the driving mechanism, the locking mechanism and the interlocking mechanism which are matched with the electric connection apparatus, combined with the characteristics of the electric connection apparatus, the electric switching apparatus in this invention has four working positions: the separation position, the trial position, the connected but not clamped position and the connected and clamped position, so that the operability and the safety of the electric switching apparatus are ensured. On the other hand, the busbar of the breaker body enters the electric connection apparatus, and the electric contact clamping between the busbar of the breaker body enters the electric connection apparatus is divided into two processes: connected but not clamped process and connected and clamped process, the operation force of the movement of the breaker body and the clamping force of the electric connection apparatus are not affected, the operation force of the whole process of the circuit breaker body entering the drawer apparatus is greatly reduced, and mutual compromise is not needed between the two kinds of forces.

The above embodiments are provided to those skilled in the art to realize or use the invention, under the condition that various modifications or changes being made by those skilled in the art without departing the spirit and principle of the invention, the above embodiments may be modified and changed variously, therefore the protection scope of the invention is not limited by the above embodiments, rather, it should conform to the maximum scope of the innovative features mentioned in the Claims.

What is claimed is:

1. An electric switching apparatus, characterized in comprising:
   a drawer apparatus, and a breaker body enters or exits the drawer apparatus;
   an electric connection apparatus, being installed on the drawer apparatus, the electric connection apparatus includes a clamping mechanism, and the electric connection apparatus connects a busbar of the breaker body and an external circuit;
   a driving mechanism, driving the breaker body to move, so that the busbar of the breaker body enters or leaves an area of the electric connection apparatus; and
   a locking mechanism driven by the driving mechanism that drives the clamping mechanism of the electric connection apparatus, so that the electric connection apparatus clamps or loosens the busbar of the breaker body;
   wherein the driving mechanism drives the breaker body to move, a relative position of the breaker body and the drawer apparatus includes:
      a separation position, in which the breaker body is separated from the electric connection apparatus, and the breaker body cannot be switched on;
      a trial position, in which the breaker body is separated from the electric connection apparatus, and the breaker body can be switched on;
      a connected but not clamped position, in which the breaker body is in touch with the electric connection apparatus, the electric connection apparatus does not clamp the busbar, and the breaker body cannot be switched on; and
      a connected and clamped position, in which the breaker body is in touch with the electric connection apparatus, the electric connection apparatus clamps the busbar, and the breaker body can be switched on;
   wherein the driving mechanism is installed on the drawer apparatus, and the driving mechanism comprises:
      a driving shaft, one end of the driving shaft is connected to a handle, and the handle is rotated to drive the driving shaft to rotate:
      a sliding plate, installed on the driving shaft, a rotation of the driving shaft is converted into a sliding of the sliding plate, the driving shaft drives the sliding plate to move, and the sliding plate moves towards an inner side or an outer side of the drawer apparatus to drive the breaker body to enter or exit the drawer apparatus;
      a main shaft, installed on the drawer apparatus, the main shaft matches with the sliding plate, when the sliding plate moves to the separation position, the trial position, the connected but not clamped position and the connected and clamped position, the main shaft correspondingly rotates to a separation angle, a trial angle, a connected but not clamped angle and a connected and clamped angle; and
      a supporting plate, installed on the drawer apparatus, the supporting plate drives the breaker body to move and matches with the main shaft, when the main shaft rotates to the separation angle, the trial angle, the connected but not clamped angle and the connected and clamped angle, the supporting plate drives the breaker body to the separation position, the trial position, the connected but not clamped position and the connected and clamped position.

2. The electric switching apparatus according to claim 1, wherein
   the sliding plate includes a first driving groove, a second driving groove, an unlocking groove and an interlocking groove;
   a first cantilever and a second cantilever are installed on the main shaft, the first cantilever includes a bifurcated first driving rod and an interlocking rod; and the second cantilever includes a bifurcated second driving rod and an unlocking rod; and
   the first driving groove and the interlocking groove form drive coupling with the bifurcated first driving rod and the interlocking rod on the first cantilever, and the second driving groove and the unlocking groove form drive coupling with the bifurcated second driving rod and the unlocking rod on the second cantilever.

3. The electric switching apparatus according to claim 2, wherein the breaker body enters the drawer apparatus, and sequentially passes through the separation position, the trial position, the connected but not clamped position and the connected and clamped position;
   in the separation position, the main shaft is located at the separation angle, the bifurcated first driving rod is located in the first driving groove, the bifurcated second driving rod is located in the second driving groove, the unlocking rod does not act with the unlocking groove, and the interlocking rod does not act with the interlocking groove;
   moving from the separation position to the trial position, the sliding plate moves towards the inner side of the drawer apparatus, an outer side end of the first driving groove pushes the bifurcated first driving rod, an outer side end of the second driving groove pushes the bifurcated second driving rod, so that the main shaft rotates to the trial angle, the unlocking rod does not act with the unlocking groove, and the interlocking rod does not act with the interlocking groove;

moving from the trial position to the connected but not clamped position, the sliding plate moves towards the inner side of the drawer apparatus, the outer side end of the first driving groove pushes the bifurcated first driving rod until the bifurcated first driving rod disengages from the first driving groove, the outer side end of the second driving groove pushes the bifurcated second driving rod until the bifurcated second driving rod disengages from the second driving groove, so that the main shaft rotates to the connected but not clamped angle, the unlocking rod enters the unlocking groove, but the unlocking rod does not act with the unlocking groove, and the interlocking rod does not act with the interlocking groove; and moving from the connected but not clamped position to the connected and clamped position, the sliding plate moves towards the inner side of the drawer apparatus, an outer side end of the unlocking groove pushes the unlocking rod to enable the main shaft to rotate to the connected and clamped angle, and the interlocking rod enters the interlocking groove, but the interlocking rod does not act with the interlocking groove.

4. The electric switching apparatus according to claim 3, wherein the breaker body exits the drawer apparatus, and sequentially passes through the connected and clamped position, the connected but not clamped position, the trial position and the separation position;

in the connected and clamped position, the main shaft is located at the connected and clamped angle, the interlocking rod is located in the interlocking groove, the unlocking rod is located in the unlocking groove, the bifurcated first driving rod does not act with the first driving groove, and the bifurcated second driving rod does not act with the second driving groove;

moving from the connected and clamped position to the connected but not clamped position, the sliding plate moves towards the outer side of the drawer apparatus, an inner side end of the interlocking groove pushes the interlocking rod until the interlocking rod disengages from the interlocking groove, so that the main shaft rotates to the connected but not clamped angle, the unlocking rod is located in the unlocking groove, but the unlocking rod does not act with the unlocking groove, the bifurcated first driving rod does not act with the first driving groove, and the bifurcated second driving rod does not act with the second driving groove;

moving from the connected but not clamped position to the trial position, the sliding plate moves towards the outer side of the drawer apparatus, an inner side end of the unlocking groove pushes the unlocking rod, so that the main shaft rotates from the connected but not clamped angle to the trial angle, the bifurcated first driving rod enters the first driving groove, the bifurcated second driving rod enters the second driving groove, the inner side end of the unlocking groove pushes the unlocking rod until the unlocking rod disengages from the unlocking groove, an inner side end of the first driving groove continues to push the bifurcated first driving rod, and an inner side end of the second driving groove continues to push the bifurcated second driving rod, so that the main shaft rotates to the trial angle; and moving from the trial position to the separation position, the sliding plate moves towards the outer side of the drawer apparatus, the inner side end of the first driving groove pushes the bifurcated first driving rod, and the inner side end of the second driving groove pushes the bifurcated second driving rod, so that the main shaft rotates to the separation angle, the bifurcated first driving rod is kept in the first driving groove, and the bifurcated second driving rod is kept in the second driving groove.

5. The electric switching apparatus according to claim 1, wherein a transmission gear is installed at both ends of the main shaft, a bottom of the supporting plate is circular and possesses transmission teeth, the transmission teeth are engaged with the transmission gear, and the main shaft rotates to drive the supporting plate to rotate; and an inner side wall of the supporting plate extends to a top position of the supporting plate to form an interlocking plate, a driving groove is formed at an inner side end of top position of the supporting plate, a connecting surface is formed at an outer side end of the top position of the supporting plate, and a convex angle is formed in the top position of an outer side wall of the supporting plate to form an exit driving part.

6. The electric switching apparatus according to claim 5, wherein further comprising a side sliding plate, the side sliding plate includes an entering shaft pin and an exit shaft pin, the breaker body is installed on the side sliding plate, the entering shaft pin is located on the inner side of the drawer apparatus, the exit shaft pin is located on the outer side of the drawer apparatus, the breaker body enters the drawer apparatus, and sequentially passes through the separation position, the trial position, the connected but not clamped position and the connected and clamped position;

in the separation position, the main shaft is located at the separation angle, the supporting plate is also located at the separation angle, the entering shaft pin of the side sliding plate is located in the driving groove, the breaker body is located at the separation position;

moving from the separation position to the trial position, the main shaft rotates from the separation angle to the trial angle to drive the supporting plate to also rotate from the separation angle to the trial angle, and an outer side end of the driving groove pushes the entering shaft pin of the side sliding plate, the breaker body is driven to move from the separation position to the trial position;

moving from the trial position to the connected but not clamped position, the main shaft rotates from the trial angle to the connected but not clamped angle to drive the supporting plate to also rotate from the trial angle to the connected but not clamped angle, and the outer side end of the driving groove pushes the entering shaft pin of the side sliding plate until the entering shaft pin disengages from the driving groove and stays on the connecting surface of the supporting plate, the breaker body is driven to move from the trial position to the connected but not clamped position; and moving from the connected but not clamped position to the connected and clamped position, the main shaft rotates from the connected but not clamped angle to the connected and clamped angle to drive the supporting plate to also rotate from the connected but not clamped angle to the connected and clamped angle, the entering shaft pin slides on the connecting surface of the supporting plate, the supporting plate does not act with the entering shaft pin, and the breaker body does not move.

7. The electric switching apparatus according to claim 6, wherein the breaker body exits the drawer apparatus, and sequentially passes through the connected and clamped position, the connected but not clamped position, the trial position and the separation position;

in the connected and clamped position, the main shaft is located at the connected and clamped angle, the supporting plate is located at the connected and clamped angle, the entering shaft pin of the side sliding plate is located on the connecting surface of the supporting plate, and the exit shaft pin of the side sliding plate is not in touch with the supporting plate;

moving from the connected and clamped position to the connected but not clamped position, the main shaft rotates from the connected and clamped angle to the connected but not clamped angle to drive the supporting plate to also rotate from the connected and clamped angle to the connected but not clamped angle, the entering shaft pin slides on the connecting surface of the supporting plate, the supporting plate does not act with the entering shaft pin or the exit shaft pin, and the breaker body does not move;

moving from the connected but not clamped position to the trial position, the main shaft rotates from the connected but not clamped angle to the trial angle to drive the supporting plate to also rotate from the connected but not clamped angle to the trial angle, the exit driving part of the supporting plate pushes the exit shaft pin to drive the breaker body to move towards the outer side of the drawer apparatus, the entering shaft pin enters the driving groove from the connecting surface of the supporting plate, the exit shaft pin separates from the supporting plate, and an inner side end of the driving groove pushes the entering shaft pin, so that the breaker body continues to move towards the outer side of the drawer apparatus to the trial position; and moving from the trial position to the separation position, the main shaft rotates from trial angle to the separation angle to drive the supporting plate also rotates from trial angle to the separation angle, the inner side end of the driving groove pushes the entering shaft pin, so that the breaker body to move towards the outer side of the drawer apparatus to the separation position.

8. The electric switching apparatus according to claim 1, wherein further comprising an interlocking mechanism, the interlocking mechanism matches with a tripping rod of the breaker body to allow or prevent the breaker body from switching on, the interlocking mechanism is installed on the drawer apparatus, and the interlocking mechanism comprises:

a drawer interlocking piece, installed on the drawer apparatus, the drawer interlocking piece is close to the outer side of the drawer apparatus, an outer side end and an inner side end of the drawer interlocking piece form respective protruding interlocking parts, and a concave releasing part is formed in a middle of the drawer interlocking piece;

a drawer push rod, installed on the drawer apparatus, the drawer push rod is located on the inner side end of the drawer interlocking piece, a middle of the drawer push rod is rotatably connected to the drawer apparatus through a rotating shaft, a top of the drawer push rod is a horizontal interlocking rod, a bottom of the drawer push rod is an inclined trigger rod, the drawer push rod possesses an interlocking position and a release position, the horizontal interlocking rod is pressed downward in the interlocking position and lifted upwards in the release position, the drawer push rod includes a push rod spring, a spring force of the push rod spring enables the drawer push rod to rotate towards the release position; and an interlocking plate, formed by an inner side wall of the supporting plate extending to a top of the supporting plate.

9. The electric switching apparatus according to claim 8, wherein the breaker body includes the tripping rod, when the tripping rod is locked, the breaker body cannot be switched on, when the tripping rod is released, the breaker body can be switched on, the breaker body enters the drawer apparatus, and sequentially passes through the separation position, the trial position, the connected but not clamped position and the connected and clamped position;

in the separation position, one of the protruding interlocking parts at the outer side end of the drawer interlocking piece locks the tripping rod, the breaker body cannot be switched on;

moving from the separation position to the trial position, the breaker body moves towards an inner side of the drawer apparatus, the tripping rod enters the concave releasing part in the middle of the drawer interlocking piece, the tripping rod is released, and the breaker body can be switched on;

moving from the trial position to the connected but not clamped position, the breaker body moves towards the inner side of the drawer apparatus, the tripping rod disengages from the concave releasing part of the drawer interlocking piece and is locked by another one the protruding interlocking parts at the inner side end of the drawer interlocking piece, the breaker body cannot be switched on, the breaker body continues to move inwards, the interlocking plate rotates along with the supporting plate and is in touch with the inclined trigger rod of the drawer push rod, the drawer push rod rotates from the release position to the interlocking position, the tripping rod is 10 separated from the drawer interlocking piece, but the tripping rod continues to be locked by the horizontal interlocking rod of the drawer push rod, and the breaker body cannot be switched on; and moving from the connected but not clamped position to the connected and clamped position, the breaker body does not move, the interlocking plate rotates along with the supporting plate and is separated from the inclined trigger rod of the drawer push rod, the drawer push rod rotates from the interlocking position to the release position under an action of the push rod spring, the horizontal interlocking rod of the drawer push rod releases the tripping rod, and the breaker body can be switched on.

10. The electric switching apparatus according to claim 9, wherein the breaker body exits the drawer apparatus, and sequentially passes through the connected and clamped position, the connected but not clamped position, the trial position and the separation position;

in the connected and clamped position, the drawer push rod is located at the release position under the action of the push rod spring, the tripping rod is released, and the breaker body can be switched on;

moving from the connected and clamped position to the connected but not clamped position, the breaker body does not move, the interlocking plate rotates along with the supporting plate and is in touch with the inclined trigger rod of the drawer push rod, the drawer push rod rotates from the release position to the interlocking position under an action of the interlocking plate, the horizontal interlocking rod of the drawer push rod locks the tripping rod, and the breaker body cannot be switched on;

moving from the connected but not clamped position to the trial position, the breaker body moves towards the outer side of the drawer apparatus, the tripping rod is separated from the horizontal interlocking rod of the drawer push rod but continues to be locked by the another one of the protruding interlocking parts at the inner side end of the drawer interlocking piece, the breaker body cannot be switched on, the breaker body moves to the trial position, the tripping rod enters the concave releasing part in the middle of the drawer interlocking piece, the tripping rod is released, and the breaker body can be switched on; and moving from the trial position to the separation position, the breaker body moves towards the outer side of the drawer apparatus, the tripping rod disengages from the concave releasing part of the drawer interlocking piece and is locked by the one of the protruding interlocking parts at the outer side end of the drawer interlocking piece, and the breaker body cannot be switched on.

11. The electric switching apparatus according to claim 1, wherein the driving mechanism drives the locking mechanism to enable the locking mechanism to drive the clamping mechanism of the electric connection apparatus, the electric connection apparatus clamps or releases the busbar of the breaker body, the locking mechanism is installed on the drawer apparatus, and the locking mechanism comprises:

a locking gear, installed on the drawer apparatus and can rotate;

a locking transmission shaft, connecting the locking gear and the locking mechanism of the electric connection apparatus, the locking gear rotates, and the clamping mechanism is driven to clamp or loosen the busbar of the breaker body through the locking transmission shaft;

a locking rack, formed on the sliding plate, the locking rack extends towards the outer side of the drawer apparatus from an inner side end of the sliding plate;

the sliding plate moves towards the inner side of the drawer apparatus, the locking rack is in touch and engaged with the locking gear to drive the locking gear to rotate according to a clamping direction, the clamping mechanism clamps the busbar of the breaker body to the electric connection apparatus; and the sliding plate moves towards the outer side of the drawer apparatus to drive the locking gear to rotate according to a loosening direction, the clamping mechanism loosen the busbar of the breaker body from the electric connection apparatus, the sliding plate continues to move towards the outer side of the drawer apparatus, and the locking rack disengages from the locking gear.

12. The electric switching apparatus according to claim 11, wherein the breaker body enters the drawer apparatus, and sequentially passes through the separation position, the trial position, the connected but not clamped position and the connected and clamped position;

in the separation position and the trial position, the locking gear is disengaged from the locking rack;

moving from the trial position to the connected but not clamped position, the sliding plate and the breaker body move toward the inner side of the drawer apparatus, the busbar of the breaker body gradually enters the electric connection apparatus, the locking rack is in touch and engaged with the locking gear to drive the locking gear to rotate according to the clamping direction, the clamping mechanism gradually clamps the busbar of the breaker body to the electric connection apparatus; and moving from the connected but not clamped position to the connected and clamped position, the breaker body does not move, the busbar of the breaker body remains completely entered in the electric connection apparatus, and the sliding plate continues to move towards the inner side of the drawer apparatus; the locking rack is engaged with the locking gear to drive the locking gear to continue to rotate in the clamping direction, and the clamping mechanism clamps the busbar of the breaker body to the electric connection apparatus.

13. The electric switching apparatus according to claim 12, wherein the breaker body exits the drawer apparatus, and sequentially passes through the connected and clamped position, the connected but not clamped position, the trial position and the separation position;

moving from the connected and clamped position to the connected but not clamped position, the breaker body does not move, the sliding plate moves towards the outer side of the drawer apparatus, the locking rack is engaged with the locking gear to drive the locking gear to rotate in the loosening direction, and the clamping mechanism loosens the busbar of the breaker body from the electric connection apparatus;

moving from the connected but not clamped position to the trial position, the sliding plate and the breaker body move toward the outer side of the drawer apparatus, the busbar of the breaker body gradually exits the electric connection apparatus, the locking rack is engaged with the locking gear to drive the locking gear to continue to rotate in the loosening direction, and the clamping mechanism continues to loosen, the sliding plate and the breaker body move toward the outer side of the drawer apparatus to the trial position, the busbar of the breaker body separates from the electric connection apparatus, the locking rack disengages from the locking gear; and moving from the trial position to the separation position, the locking gear remains disengaged from the locking rack.

14. The electric switching apparatus according to claim 11, wherein the breaker body enters the drawer apparatus, and sequentially passes through the separation position, the trial position, the connected but not clamped position and the connected and clamped position;

in the separation position and the trial position, the locking gear is disengaged from the locking rack;

moving from the trial position to the connected but not clamped position, the sliding plate and the breaker body move toward the inner side of the drawer apparatus, the busbar of the breaker body gradually enters the electric connection apparatus, the locking rack is in touch and engaged with the locking gear to drive the locking gear to rotate according to the clamping direction, the clamping mechanism gradually clamps the busbar of the breaker body to the electric connection apparatus; and moving from the connected but not clamped position to the connected and clamped position, the breaker body does not move, the busbar of the breaker body remains completely entered in the electric connection apparatus, and the sliding plate continues to move towards the inner side of the drawer apparatus; the locking rack is in touch and engaged with the locking gear to drive the locking gear to continue to rotate in the clamping direction, and the clamping mechanism clamps the busbar of the breaker body to the electric connection apparatus.

15. The electric switching apparatus according to claim 14, wherein the breaker body exits the drawer apparatus, and sequentially passes through the connected and clamped position, the connected but not clamped position, the trial position and the separation position;

moving from the connected and clamped position to the connected but not clamped position, the breaker body does not move, the sliding plate moves towards the outer side of the drawer apparatus, the locking rack is engaged with the locking gear to drive the locking gear to rotate in the loosening direction, and the clamping mechanism loosens the busbar of the breaker body, the sliding plate moves to the outer side of the drawer apparatus to the connected but not clamped position, the locking rack disengages from the locking gear;

moving from the connected but not clamped position to the trial position, the sliding plate and the breaker body move toward the outer side of the drawer apparatus, the busbar of the breaker body gradually exits the electric connection apparatus, the locking rack disengages from the locking gear; and moving from the trial position to the separation position, the locking gear remains disengaged from the locking rack.

\* \* \* \* \*